US012730502B2

(12) United States Patent
Moon et al.

(10) Patent No.: US 12,730,502 B2
(45) Date of Patent: Sep. 8, 2026

(54) METHOD FOR CONTROLLING EXTERNAL ELECTRONIC DEVICE USING REMOTE CONTROL DEVICE, AND ELECTRONIC DEVICE SUPPORTING SAME

(71) Applicant: Samsung Electronics Co., Ltd., Suwon-si (KR)

(72) Inventors: Choonkyoung Moon, Suwon-si (KR); Dohyoung Kim, Suwon-si (KR); Juyeon You, Suwon-si (KR); Seungjoon Lee, Suwon-si (KR); Yongjun Lim, Suwon-si (KR); Hoon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/047,010

(22) Filed: Feb. 6, 2025

(65) Prior Publication Data

US 2025/0181151 A1 Jun. 5, 2025

Related U.S. Application Data

(63) Continuation of application No. PCT/KR2023/010695, filed on Jul. 24, 2023.

(30) Foreign Application Priority Data

Aug. 25, 2022 (KR) ........................ 10-2022-0107197

(51) Int. Cl.

*G06F 3/01* (2006.01)
*H04L 67/561* (2022.01)

(Continued)

(52) U.S. Cl.

CPC ............ *G06F 3/012* (2013.01); *H04L 67/561* (2022.05); *H04W 72/51* (2023.01); *H04W 76/10* (2018.02)

(58) Field of Classification Search

CPC . G06F 3/012; G06F 3/011; G06F 3/01; G06F 3/013; H04L 67/561; H04L 12/28;

(Continued)

(56) References Cited

U.S. PATENT DOCUMENTS 7,653,212 B2 * 1/2010 Haughawout .... H04N 21/42222 348/734
8,683,086 B2 * 3/2014 Reeves .............. G05B 19/0426 710/10

(Continued)

FOREIGN PATENT DOCUMENTS

KR 20060112531 A 11/2006
KR 20190080119 A 7/2019

(Continued)

OTHER PUBLICATIONS

International Search Report for PCT /KR2023/010695 mailed Oct. 30, 2023, 4 pages with English translation.

(Continued)

*Primary Examiner* — Benyam Ketema
(74) *Attorney, Agent, or Firm* — Nixon & Vanderhye P.C.

(57) ABSTRACT

An electronic device, according to an embodiment, may comprise; a communication module comprising communication circuitry; and at least one processor comprising processing circuitry. At least one processor, individually and/or collectively, may be configured to detect a first remote control device; establish a communication connection with the first remote control device through the communication module; determine a first external electronic device to be controlled using the first remote control device; establish a communication connection between the electronic device and the first external electronic device; map at least one key of the first remote control device and at least one function of the first external electronic device; and control the first external electronic device to perform the at (Continued)

least one function using the at least one key of the first remote control device and the first remote control device.

18 Claims, 25 Drawing Sheets

(51) Int. Cl.
*H04W 72/51* (2023.01)
*H04W 76/10* (2018.01)

(58) Field of Classification Search
CPC .... H04L 12/282; H04W 72/51; H04W 76/10; G16Y 10/80; G16Y 40/30; H04Q 9/04
See application file for complete search history.

(56) References Cited

U.S. PATENT DOCUMENTS 8,789,131 B2* 7/2014 Choi ........................ H04L 67/52 725/148
9,229,231 B2* 1/2016 Small ...................... G06F 3/167
9,329,678 B2* 5/2016 Krauss ............. H04N 21/42208
9,773,345 B2* 9/2017 Stirbu ................. G06F 3/04847
10,310,704 B2* 6/2019 Meganathan ......... H04W 4/029
10,353,532 B1* 7/2019 Holz ................... G06F 3/04847
10,425,677 B2 9/2019 Kim et al.
11,044,405 B1* 6/2021 Meyer ................... G06F 3/0346
11,861,136 B1* 1/2024 Faulkner ............. G06F 3/04815
2006/0245097 A1* 11/2006 Chang ............. H04N 21/42204 360/1
2007/0210932 A1* 9/2007 Koshiba ................. G08C 23/04 340/12.22
2008/0084867 A1* 4/2008 Foti ..................... H04L 65/1094 370/352
2010/0134411 A1* 6/2010 Tsumura .......... H04N 21/42204 345/156
2010/0313171 A1* 12/2010 Yanagi ............... H04N 21/4122 715/856
2011/0305443 A1* 12/2011 Sasaki .................. H04N 13/183 386/E5.028
2012/0124245 A1* 5/2012 Reeves .............. G05B 19/0426 715/744
2012/0141087 A1* 6/2012 Carlsgaard ........... H04N 21/488 386/230
2012/0209916 A1* 8/2012 Azuma ............... H04L 12/2814 709/204
2013/0069985 A1* 3/2013 Wong ........................ G06F 3/14 345/633
2013/0088332 A1* 4/2013 Park ..................... H04N 21/472 340/10.1
2013/0147686 A1* 6/2013 Clavin ................. G02B 27/017 345/8
2013/0207963 A1* 8/2013 Stirbu ..................... G06T 19/00 345/419
2013/0258207 A1* 10/2013 Kim ................. H04N 21/41265 348/734
2014/0022461 A1* 1/2014 Kuo ..................... H04N 21/482 348/734
2014/0327782 A1* 11/2014 Mangla .............. H04N 21/4332 348/161
2015/0061969 A1* 3/2015 Chi ....................... G06F 3/1454 345/2.3
2015/0084857 A1* 3/2015 Kimura ................... G06F 1/163 345/156
2016/0037573 A1* 2/2016 Ko ........................ H04W 76/14 455/41.2
2016/0165170 A1* 6/2016 McRae ............ H04N 21/42204 348/734
2016/0323626 A1* 11/2016 Kim ................. H04N 21/42225
2017/0201706 A1 7/2017 Zhong et al.
2018/0157398 A1* 6/2018 Kaehler ................... G06N 3/02
2019/0034765 A1* 1/2019 Kaehler ................. G06V 20/20
2020/0090499 A1 3/2020 Kim et al.
2021/0072877 A1 3/2021 Kim et al.
2021/0232212 A1 7/2021 Stolzenberg et al.
2021/0358294 A1* 11/2021 Parashar ................ G08C 17/02
2022/0035498 A1 2/2022 Kim et al.
2022/0092861 A1* 3/2022 Sharma ................... H04L 67/52
2022/0155909 A1* 5/2022 Kawashima .......... G06F 3/0362
2023/0245456 A1 8/2023 Nakade et al.
2023/0319398 A1* 10/2023 Sun ......................... H04W 4/80 348/211.2
2025/0181151 A1* 6/2025 Moon ...................... H04Q 9/04

FOREIGN PATENT DOCUMENTS

KR 102017692 B1 8/2019
KR 20190094381 A 8/2019
KR 20220009244 A 1/2022
WO 2022009338 A1 1/2022

OTHER PUBLICATIONS

Written Opinion of the ISA for PCT /KR2023/010695 mailed Oct. 30, 2023, 5 pages.

* cited by examiner

METHOD FOR CONTROLLING EXTERNAL ELECTRONIC DEVICE USING REMOTE CONTROL DEVICE, AND ELECTRONIC DEVICE SUPPORTING SAME

CROSS-REFERENCE TO RELATED APPLICATIONS

This application is a continuation of International Application No. PCT/KR2023/010695 designating the United States, filed on Jul. 24, 2023, in the Korean Intellectual Property Receiving Office and claiming priority to Korean Patent Application No. 10-2022-0107197, filed on Aug. 25, 2022, in the Korean Intellectual Property Office, the disclosures of each of which are incorporated by reference herein in their entireties.

BACKGROUND

Field

The disclosure relates to a method for controlling an external electronic device using a remote control device and an electronic device supporting the same.

Description of Related Art

As communication technology develops, electronic devices are becoming small and light enough to be used without great inconvenience while being worn on the user's body. For example, wearable electronic devices such as head mounted devices (HMDs), smart watches (or bands), contact lens-type devices, ring-type devices, glove-type devices, shoe-type devices, or clothing-type devices are being commercialized. Since wearable electronic devices are worn directly on the body, portability and user accessibility may be improved.

An HMD device is a device to be used while being worn on the user's head or face, and may provide augmented reality (AR) to the user. For example, an HMD device that provides augmented reality may be implemented in the form of glasses and may provide information about objects in the form of images or text to the user in at least a portion of the user's field of view. The HMD device may provide virtual reality (VR) to the user. For example, it may output independent images to both eyes of the user, thereby outputting content provided through external input to the user in the form of video or sound, so that an excellent sense of immersion may be provided. In addition, the HMD device may provide mixed reality (MR) and/or extended reality (XR).

A user may control an electronic device (e.g., a home appliance) using a remote control device (e.g., a remote control). The user may control the electronic device using a remote control device dedicated to the electronic device. For example, the user may control functions of a TV using a remote control device for a TV, and functions of an air conditioner using a remote control for an air conditioner. In this case, the user may experience inconvenience because the user must use a remote control device dedicated to an electronic device whenever the user wishes to use the electronic device.

SUMMARY

Embodiments of the disclosure provide a method for controlling an external electronic device using a remote control device, which enables the user wearing an electronic device (e.g., an HMD device) to control an electronic device (e.g., a home appliance) that the user wishes to control using a single remote control device, and an electronic device supporting the method.

An electronic device according to an example embodiment may include: a communication module comprising communication circuitry and at least one processor comprising processing circuitry. At least one processor, individually and/or collectively, may be configured to: detect a first remote control device; establish a communication connection with the first remote control device through the communication module; determine a first external electronic device to be controlled using the first remote control device; cause the communication module to establish a communication connection between the electronic device and the first external electronic device; perform an operation of mapping at least one key of the first remote control device and at least one function of the first external electronic; and control the first external electronic device to perform the at least one function using at least one key of the first remote control device and the first remote control device.

A method for controlling an external electronic device using a remote control device in an electronic device according to an example embodiment may include: detecting a first remote control device; establishing a communication connection with the first remote control device through a communication module of the electronic device; determining a first external electronic device to be controlled using the first remote control device; establishing a communication connection between the electronic device and the first external electronic device through the communication module; performing an operation of mapping at least one key of the first remote control device and at least one function of the first external electronic device; and controlling the first external electronic device to perform the at least one function using the first remote control device.

An electronic device according to an example embodiment may include a communication module comprising communication circuitry and at least one processor comprising processing circuitry. At least one processor, individually and/or collectively, may be configured to: detect a first external electronic device; cause the communication module to establish a communication connection between the electronic device and the external electronic device; detect a first remote control device; establish a communication connection with the first remote control device through the communication module; perform an operation of mapping at least one key of the first remote control device and at least one function of the first external electronic device; and control the first external electronic device to perform the at least one function using the first remote control device.

In an example embodiment, there is provided a non-transitory computer-readable medium having computer-executable instructions recorded thereon, wherein the computer-executable instructions may, when executed by at least one processor, comprising processing circuitry, individually and/or collectively, of an electronic device, cause the electronic device to: obtain at least one image; obtain at least one region of interest associated with an object within the at least one image; detect a first remote control device; establish a communication connection with the first remote control device through the communication module; determine a first external electronic device to be controlled using the first remote control device; cause the communication module to establish a communication connection between the electronic device and the first external electronic device; perform an operation of mapping at least one key of the first remote control device and at least one function of the first external electronic device; and control the first external electronic device to perform the at least one function using at least one key of the first remote control device and the first remote control device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
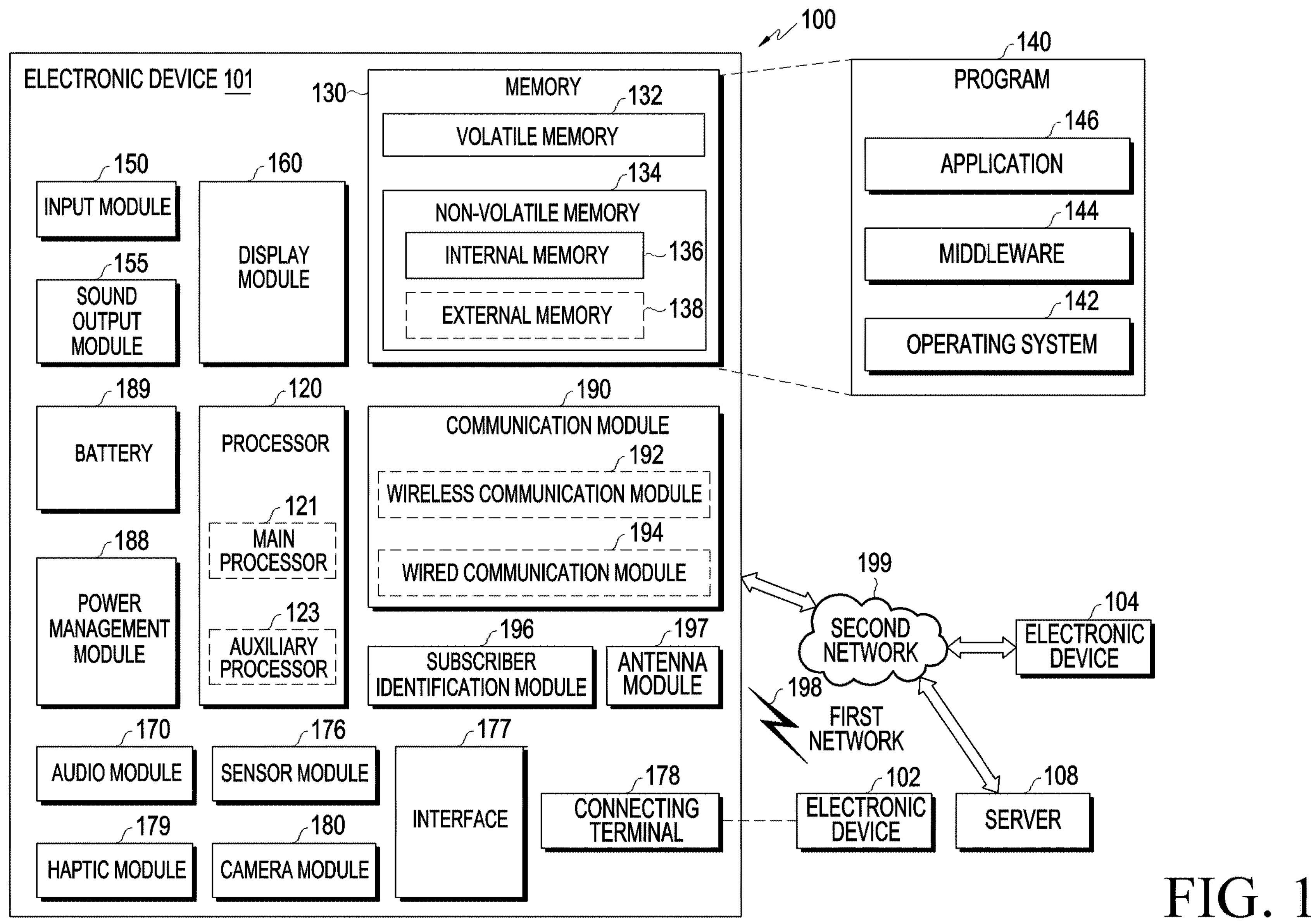
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with an embodiment of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
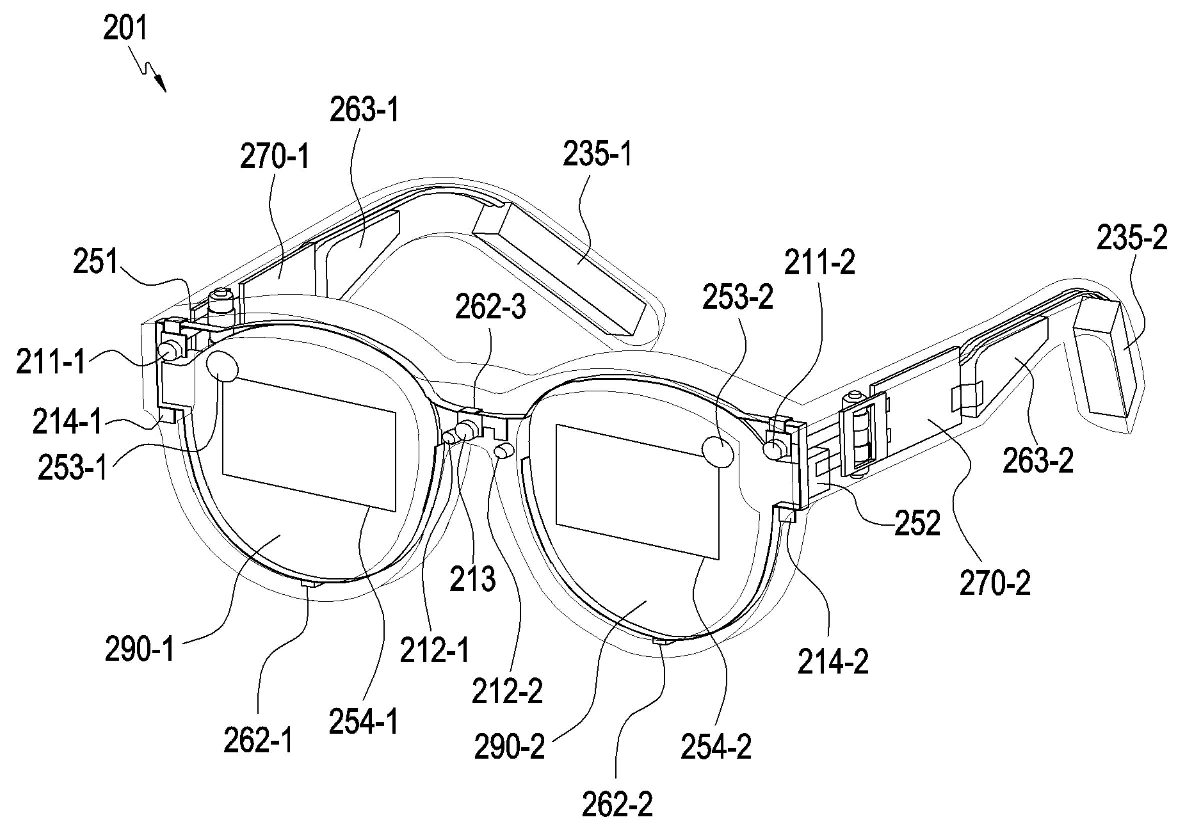
FIG. 2 is a perspective view illustrating an example configuration of an electronic device according to various embodiments.

FIG. 2 is a perspective view illustrating an example structure of an electronic device 201 according to various embodiments.

Referring to FIG. 2, in an embodiment, the electronic device 201 (e.g., the electronic device 101) may include one or more first cameras 211-1 and 211-2, one or more second cameras 212-1 and 212-2, and one or more third cameras 213. In an embodiment, an image obtained through one or more first cameras 211-1 and 211-2 may be used for detecting a hand gesture by a user, tracking the user's head, and/or recognizing space. In an embodiment, one or more first cameras 211-1 and 211-2 may be global shutter (GS) cameras.

In an embodiment, one or more first cameras 211-1 and 211-2 may perform simultaneous localization and mapping (SLAM) operation through depth photographing. In an embodiment, one or more first cameras 211-1 and 211-2 may perform spatial recognition for 6DoF (degrees of freedom).

In an embodiment, an image obtained through one or more second cameras 212-1 and 212-2 may be used to detect and track the user's pupil. In an embodiment, one or more second cameras 212-1 and 212-2 may be GS cameras. In an embodiment, one or more second cameras 212-1 and 212-2 may correspond to the left eye and the right eye, respectively, and one or more second cameras 212-1 and 212-2 may have the same performance.

In an embodiment, one or more third cameras 213 may be high-resolution cameras. In an embodiment, one or more third cameras 213 may perform an auto-focusing (AF) function and an image stabilization function. In an embodiment, one or more third cameras 213 may be GS cameras or rolling shutter (RS) cameras.

In an embodiment, the electronic device 201 may include one or more light-emitting elements 214-1 and 214-2. In an embodiment, the light-emitting elements 214-1 and 214-2 may be different from a light source described below, which emits light to the screen output area of a display. In an embodiment, the light-emitting elements 214-1 and 214-2 may emit light to facilitate detection of the pupil when detecting and tracking the pupil of the user through one or more second cameras 212-1 and 212-2.

In an embodiment, each of the light-emitting elements 214-1 and 214-2 may include a light-emitting diode (LED). In an embodiment, the light-emitting elements 214-1 and 214-2 may emit light in the infrared range. In an embodiment, the light-emitting elements 214-1 and 214-2 may be attached to the periphery of a frame of the electronic device 201. In an embodiment, the light-emitting elements 214-1 and 214-2 may be positioned around one or more first cameras 211-1 and 211-2 and may assist in gesture detection, head tracking, and spatial recognition by one or more first cameras 211-1 and 211-2 when the electronic device 201 is used in a dark environment. In an embodiment, the light-emitting elements 214-1 and 214-2 may be positioned around one or more third cameras 213 and may assist in obtaining images by one or more third cameras 213 when the electronic device 201 is used in a dark environment.

In an embodiment, the electronic device 201 may include batteries 235-1 and 235-2. The batteries 235-1 and 235-2 may store power to operate the remaining elements of the electronic device 201.

In an embodiment, the electronic device 201 may include a first display 251, a second display 252, one or more optical input members 253-1 and 253-2, one or more transparent elements 290-1 and 290-2, and one or more screen display areas 254-1 and 254-2.

In an embodiment, the first display 251 and the second display 252 may include, for example, a liquid crystal display (LCD), a digital mirror device (DMD), a liquid crystal-on-silicon (LCoS), an organic light-emitting diode (OLED), or a micro light-emitting diode (micro LED).

In an embodiment, in the case where the first display 251 and the second display 252 are configured as one of the liquid crystal display, digital mirror display, or liquid crystal-on-silicon, the electronic device 201 may include a light source that emits light to the screen output area of the display. In an embodiment, in the case where the first display 251 and the second display 252 are configured to generate light on their own (e.g., configured as one of the organic light-emitting diode or the micro LED), the electronic device 201 may provide a virtual image of better quality to the user even without a separate light source.

In an embodiment, one or more transparent members 290-1 and 290-2 may be arranged to face the user's eyes when the user wears the electronic device 201. In an embodiment, one or more transparent members 290-1 and 290-2 may include at least one of a glass plate, a plastic plate, or a polymer. In an embodiment, the user may view the outside through one or more transparent members 290-1 and 290-2 when wearing the electronic device 201. In an embodiment, one or more optical input members 253-1 and 253-2 may guide light generated from the first display 251 and the second display 252 to the user's eyes. In an embodiment, an image based on the light generated from the first display 251 and the second display 252 may be formed on one or more screen display areas 254-1 and 254-2 on one or more transparent members 290-1 and 290-2, and the user may view the image formed on one or more screen display areas 254-1 and 254-2.

In an embodiment, the electronic device 201 may include one or more optical waveguides (not shown). The optical waveguide may transmit light generated from the first display 251 and the second display 252 to the user's eyes. The electronic device 201 may include one optical waveguide corresponding to the left eye and one optical waveguide corresponding to the right eye, respectively. In an embodiment, the optical waveguide may include at least one of glass, plastic, or polymer. In an embodiment, the optical waveguide may include a nano-pattern formed on one surface of the inner or outer surface, for example, a grating structure having a polygonal or curved shape. In an embodiment, the optical waveguide may include a free-form prism, and in this case, the optical waveguide may provide incident light to the user through a reflective mirror. In an embodiment, the optical waveguide may include at least one of a diffractive element (e.g., a diffractive optical element (DOE) or a holographic optical element (HOE)) or a reflective element (e.g., a reflective mirror), and may guide display light emitted from a light source to the user's eyes using at least one diffractive element or reflective element included in the optical waveguide. In an embodiment, the diffractive element may include an optical input/output member. In an embodiment, the reflective element may include an element that causes total reflection.

In an embodiment, the electronic device 201 may include one or more voice input devices 262-1, 262-2, and 262-3 and one or more voice output devices 263-1 and 263-2.

In an embodiment, the electronic device 201 may include a first PCB 270-1 and a second PCB 270-2. The first PCB 270-1 and the second PCB 270-2 may be configured to transmit electrical signals to elements included in the electronic device 201, such as one or more first cameras 211-1 and 211-2, one or more second cameras 212-1 and 212-2, one or more third cameras 213, displays, audio modules, and sensors. In an embodiment, the first PCB 270-1 and the second PCB 270-2 may include a flexible printed circuit board (FPCB). In an embodiment, each of the first PCB 270-1 and the second PCB 270-2 may include a first substrate, a second substrate, and an interposer disposed between the first substrate and the second substrate.

Figure 3:
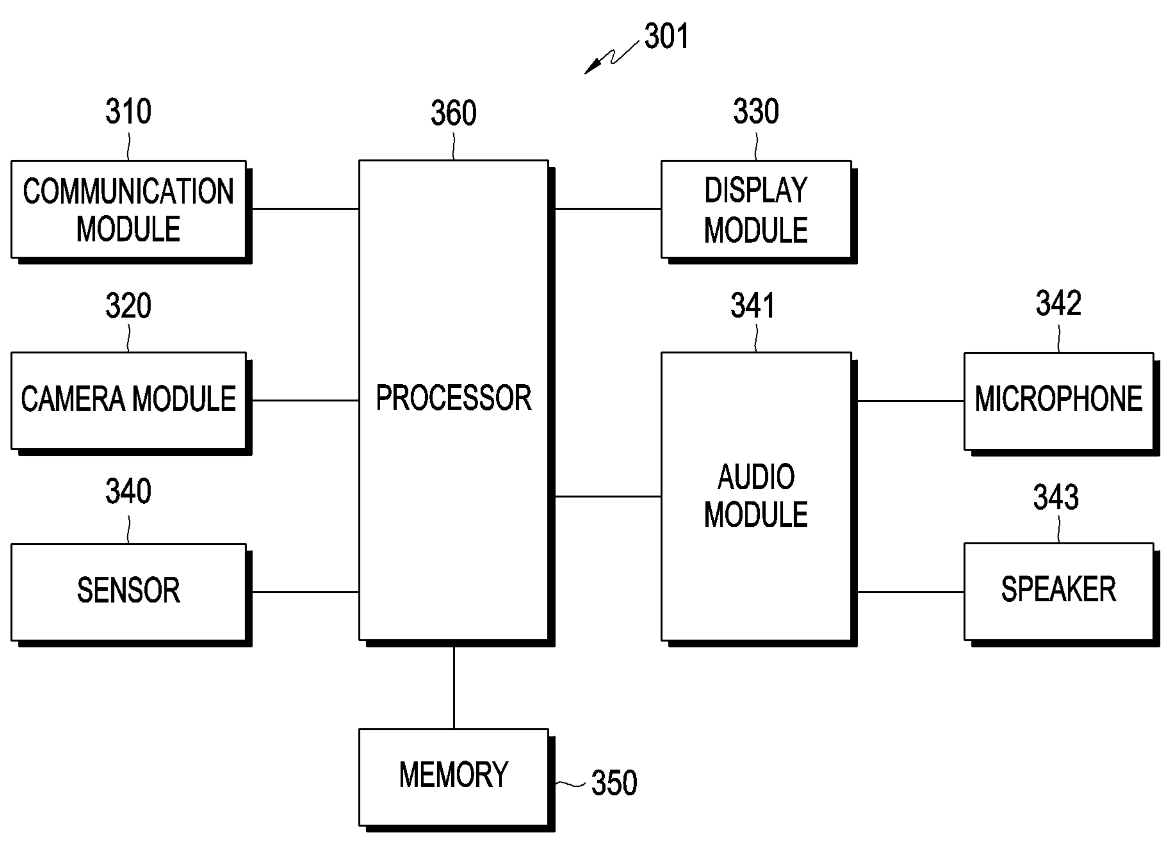
FIG. 3 is a block diagram illustrating an example configuration of an electronic device according to various embodiments.

FIG. 3 is a block diagram illustrating an example configuration of an electronic device 301 according to various embodiments.

Referring to FIG. 3, in an embodiment, the electronic device 301 may be included in the electronic device 101 of FIG. 1 or the electronic device 201 of FIG. 2. For example, the electronic device 301 may be an HMD device capable of providing augmented reality, virtual reality, mixed reality, and/or extended reality.

In an embodiment, the electronic device 301 may include a communication module (e.g., including communication circuitry) 310, a camera module (e.g., including a camera) 320, a display module (e.g., including a display) 330, a sensor 340, an audio module (e.g., including audio circuitry) 341, a microphone 342, a speaker 343, memory 350, and/or a processor (e.g., including processing circuitry) 360.

In an embodiment, the communication module 310 may be included in the communication module 190 of FIG. 1.

In an embodiment, the communication module 310 may include various communication circuitry and establish a communication connection between the electronic device 301 and a remote control device (e.g., a remote control), a server, and/or at least one external electronic device. For example, the communication module 310 may establish a communication connection between the electronic device 301 and the remote control device. For example, the communication module 310 may establish a communication connection between the electronic device 301 and a server (e.g., an IoT server) capable of controlling the external electronic device using Internet-of-things (IoT) technology. For example, the communication module 310 may establish a communication connection between the electronic device 301 and at least one external electronic device (e.g., an IoT device registered to an IoT server). However, the devices that may be connected with the electronic device 301 by the communication module 310 are not limited to the aforementioned remote control device, server, and/or at least one external electronic device.

In an embodiment, the communication module 310 may receive a command from the remote control device. For example, a short-range communication module (e.g., Bluetooth or Wi-Fi) may receive, from the remote control device that is in communication connection with the electronic device 301, a command (e.g., a command to control a function of an external electronic device) corresponding to a user input inputted to the remote control device. For example, an infrared (IR) communication (infrared communication) module (also referred to as an "IR sensor") may receive a command from the remote control device that is in communication connection with the electronic device 301. However, the communication module 310 for receiving a command from the remote control device is not limited to the short-range communication module and IR communication module described above.

In an embodiment, the camera module 320 may be included in the camera module 180 of FIG. 1.

In an embodiment, the camera module 320 may include a plurality of cameras. For example, the camera module 320 may include cameras (e.g., one or more first cameras 211-1 and 211-2 in FIG. 2) for detecting hand gestures by the user, tracking the user's head, and/or recognizing space. For example, the camera module 320 may include cameras (e.g., one or more second cameras 212-1 and 212-2 in FIG. 2) used for detecting and tracking the user's eyes. For example, the camera module 320 may include a camera (e.g., the third camera 213 in FIG. 2) for performing an auto-focusing function and an image stabilization function. However, the cameras included in the camera module 320 are not limited to the examples described above, and the camera module 320 may exclude at least some of the cameras described above.

In an embodiment, the display module 330 may include a display and be included in the display module 160 in FIG. 1.

In an embodiment, the sensor 340 may obtain information about the movement (and direction) of the electronic device. In an embodiment, the sensor 340 may include a six-axis sensor, a magnetic sensor, a proximity sensor, and/or an optical sensor.

In an embodiment, the audio module 341 may include various audio circuitry and be included in the audio module 170 in FIG. 1. In an embodiment, the microphone 342 may be included in the input module 150 in FIG. 1. In an embodiment, the speaker 343 may be included in the audio output module 155 in FIG. 1.

In an embodiment, the memory 350 may be included in the memory 130 in FIG. 1.

In an embodiment, the memory 350 may store information for performing an operation of controlling an external electronic device using the remote control device. The information stored in the memory 350 will be described later.

In an embodiment, the processor 360 may be included in the processor 120 in FIG. 1.

In an embodiment, the processor 360 may include various processing circuitry and control the overall operation of controlling an external electronic device using the remote control device. In an embodiment, the processor 360 may include one or more processors for performing the operation of controlling the external electronic device using the remote control device. The operation of controlling the external electronic device by the processor 360 using the remote control device will be described with reference to FIG. 4 and subsequent drawings.

Although FIG. 3 illustrates that the electronic device 301 includes a communication module 310, a camera module 320, a display module 330, a sensor 340, memory 350, an audio module 341, a microphone 342, a speaker 343, and a processor 360, the disclosure is not limited thereto. For example, the electronic device 301 may further include at least one of the configurations illustrated in FIG. 1 or FIG. 2. For example, the electronic device 301 may exclude at least one of the configurations illustrated in FIG. 3.

The electronic device according to an example embodiment may include: a communication module comprising processing circuitry and at least one processor comprising processing circuitry. At least one processor, individually and/or collectively, may be configured to: detect a first remote control device; establish a communication connection with the first remote control device through the communication module; determine a first external electronic device to be controlled using the first remote control device; control the communication module to establish a communication connection between the electronic device and the first external electronic device; perform an operation of mapping at least one key of the first remote control device and at least one function of the first external electronic device; and control the first external electronic device to perform at least one function using at least one key of the first remote control device and the first remote control device.

In an example embodiment, the electronic device may further include a camera module comprising at least one camera, wherein at least one processor, individually and/or collectively, may be configured to obtain an image through the camera module and, based on the image, detect the first remote control device positioned in a range corresponding to the gaze of a user wearing the electronic device.

In an example embodiment, at least one processor, individually and/or collectively, may be configured to: detect movement of the first remote control device, request a second external electronic device corresponding to the first remote control device to forward a command of the first remote control device to the electronic device, based on detecting the movement of the first remote control device, and establish a communication connection with the first remote control device.

In an example embodiment, at least one processor, individually and/or collectively, may be configured to: receive, via the second external electronic device and a server from the first remote control device through the communication module, an input to the first remote control device, the input being input for a communication connection with the first remote control device, and establish a communication connection with the first remote control device, based on the input.

In an example embodiment, at least one processor, individually and/or collectively, may be configured to: detect the first external electronic device and control the communication module to establish a communication connection between the first external electronic device and the electronic device.

In an example embodiment, at least one processor, individually and/or collectively, may be configured to: output a list of external electronic devices which are controllable using the first remote control device, based on the communication connection with the first remote control device being established, determine the first external electronic device from among the external electronic devices, based on an input to the list, and control the communication module to establish a communication connection between the first external electronic device and the electronic device.

In an example embodiment, at least one processor, individually and/or collectively, may be configured to: display, through the display module of the electronic device, at least one object corresponding to at least one function of the first external electronic device so that the at least one object is, viewable to be disposed in a three-dimensional space around the electronic device, select an object corresponding to a user's gaze from among the at least one object, receive, from the first remote control device through the communication module, information about a key of the first remote control device, an input being input to the key, a function corresponding to the object being to be mapped to the key, and map a function corresponding to the selected object to the key of the first remote control device.

In an example embodiment, at least one processor, individually and/or collectively, may be configured to: classify at least one function of the first external electronic device into groups having priorities, based on the user's use history for each of the at least one function, and display the at least one object, based on the priorities of the groups, through the display module so that the at least one object is, by the user, viewable to be disposed in a three-dimensional space around the electronic device.

In an example embodiment, at least one processor, individually and/or collectively, may be configured to: display, based on the at least one function of the first external electronic device being mapped to at least one key of the first remote control device, an object to overlap the at least one key of the first remote control device through the display module of the electronic device, the object indicating the at least one mapped function.

An electronic device according to an example embodiment may include: a communication module comprising communication circuitry and at least one processor comprising processing circuitry. At least one processor, individually and/or collectively, may be configured to: detect a first external electronic device; control the communication module to establish a communication connection between the electronic device and the first external electronic device; detect the first remote control device; establish a communication connection with the first remote control device through the communication module; perform an operation of mapping at least one key of the first remote control device and at least one function of the first external electronic device; and control the first external electronic device to perform at least one function using the first remote control device.

In an example embodiment, at least one processor, individually and/or collectively, may be configured, based on the first external electronic device and the electronic device being in communication connection, to display information about at least one remote control device capable of controlling the first external electronic device through the display module of the electronic device.

Figure 4:
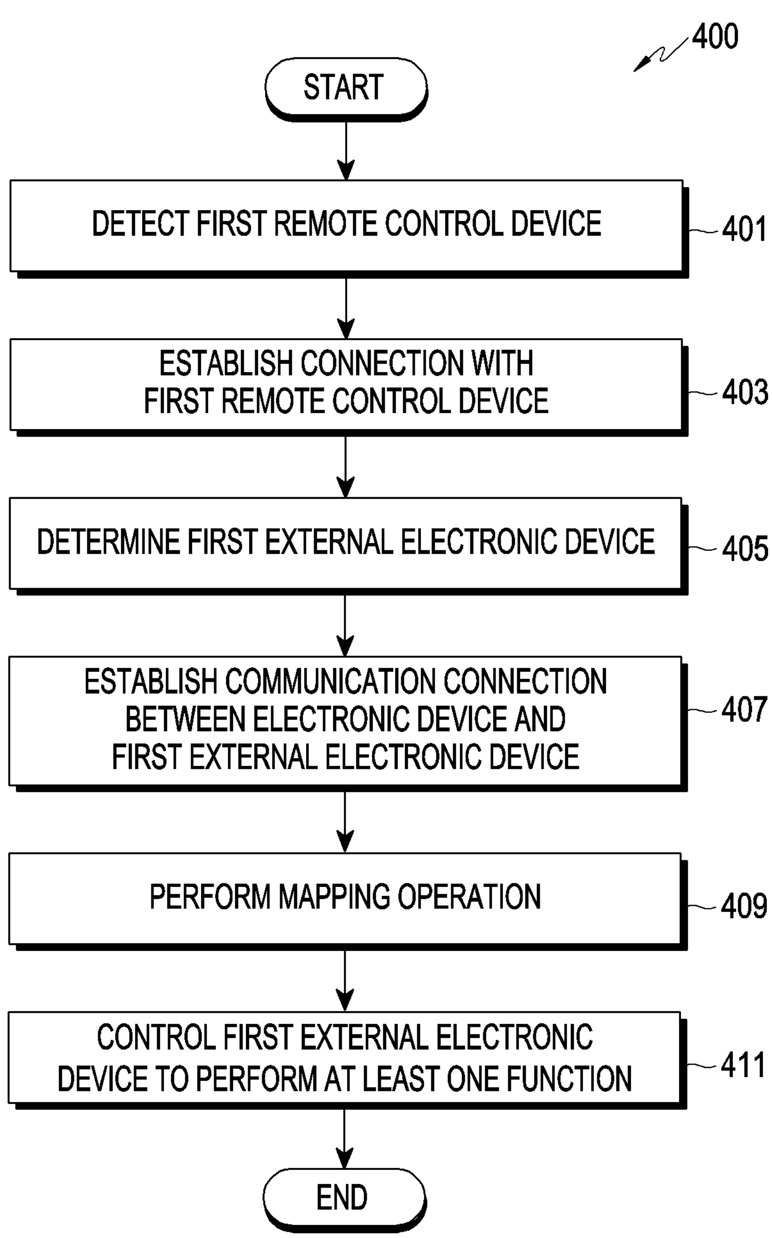
FIG. 4 is a flowchart illustrating an example method for controlling an external electronic device using a remote control device according to various embodiments.

FIG. 4 is a flowchart 400 illustrating an example method of controlling an external electronic device using a remote control device according to various embodiments.

Referring to FIG. 4, in operation 401, in an embodiment, the processor 360 may detect a first remote control device. For example, the processor 360 may detect (or recognize) a remote control device (hereinafter referred to as a "first remote control device") for controlling the external electronic device.

In an embodiment, the processor 360 may detect a first remote control device, based on an image obtained through the camera module 320.

In an embodiment, the processor 360 may detect the gaze of a user wearing the electronic device 301 through the camera module 320 (e.g., one or more second cameras 212-1 and 212-2 in FIG. 2). The processor 360 may obtain an image of the first remote control device located within a range (e.g., view) corresponding to the user's gaze through the camera module 320 (e.g., one or more first cameras 211-1 and 211-2 in FIG. 2). The processor 360 may compare the obtained image with a plurality of images stored in the memory 350 and including remote control devices, thereby detecting the first remote control device. The processor 360 may detect the first remote control device to obtain information about the first remote control device (e.g., the type, name, and model name of the first remote control device, functions performed by the first remote control device, an external electronic device to which the remote control device is dedicated, and an operating state) from the memory 350.

In an embodiment, the processor 360 may obtain an image of the first remote control device located in a range of field of view of the camera module 320 (e.g., a designated area from the center of the field of view of the camera module 320) through the camera module 320 (e.g., one or more first cameras 211-1 and 211-2 in FIG. 2). The processor 360 may compare the obtained image with a plurality of images stored in the memory 350 and including remote control devices, thereby detecting the first remote control device.

The processor 360 may obtain information about the first remote control device from the memory 350 by detecting the first remote control device.

Although the above examples show that the processor 360 detects the first remote control device, based on the image obtained through the camera module 320, the disclosure is not limited thereto. For example, the processor 360 may detect the first remote control device located in the direction in which the electronic device is facing through the communication module 310 (e.g., ultra-wideband (UWB) communication module 310).

Hereinafter, a method for detecting the first remote control device will be described in greater detail with reference to FIGS. 5A and 5B.

Figure 5A:
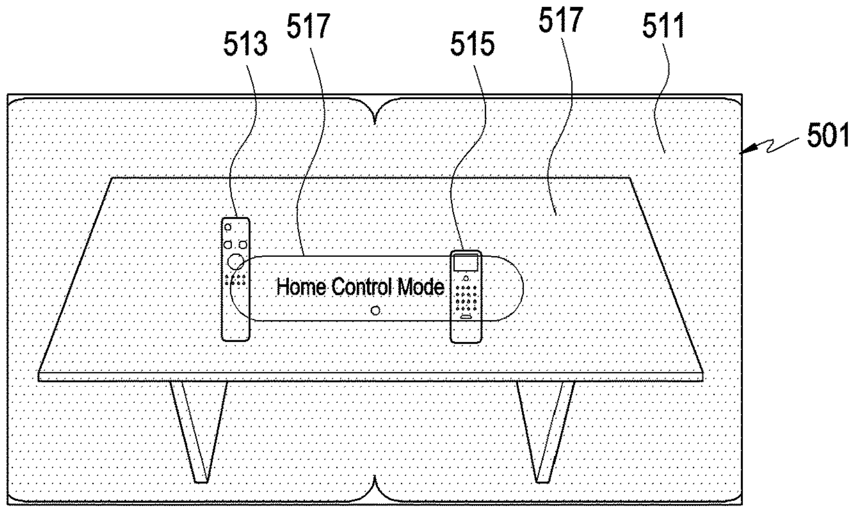
FIG. 5A and FIG. 5B are diagrams illustrating an example method for detecting a first remote control device according to various embodiments.
Figure 5A:
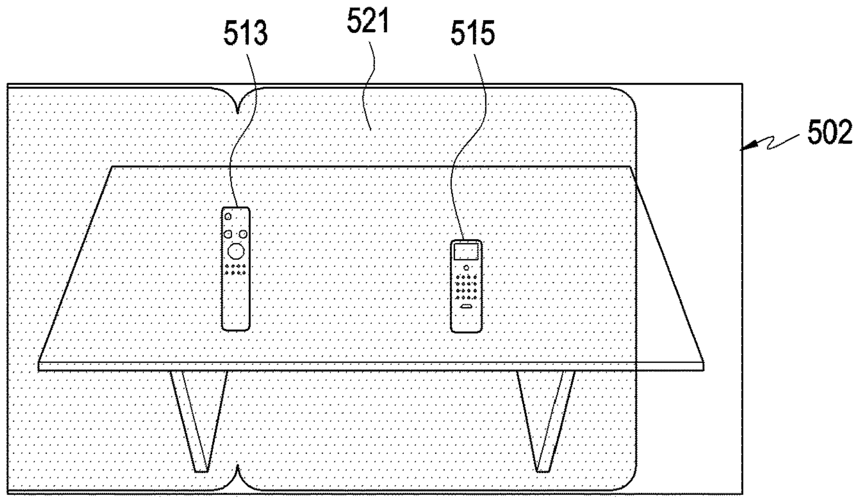
Figure 5A:
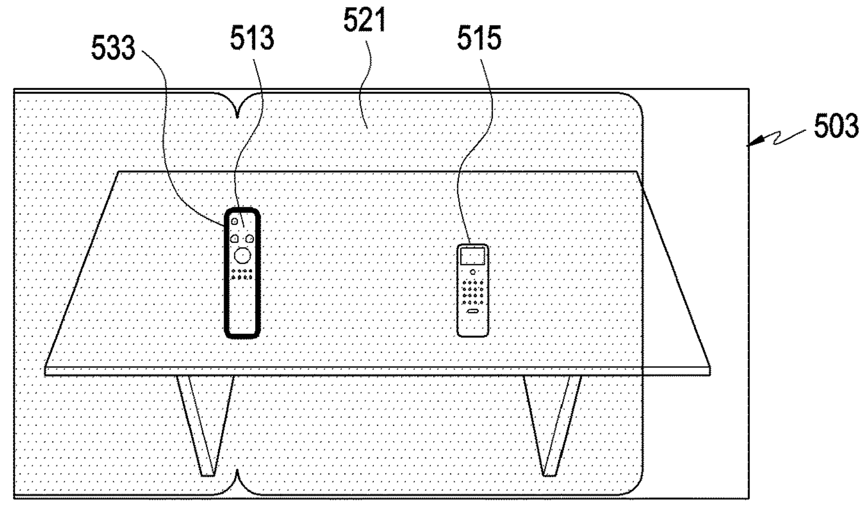
Figure 5B:
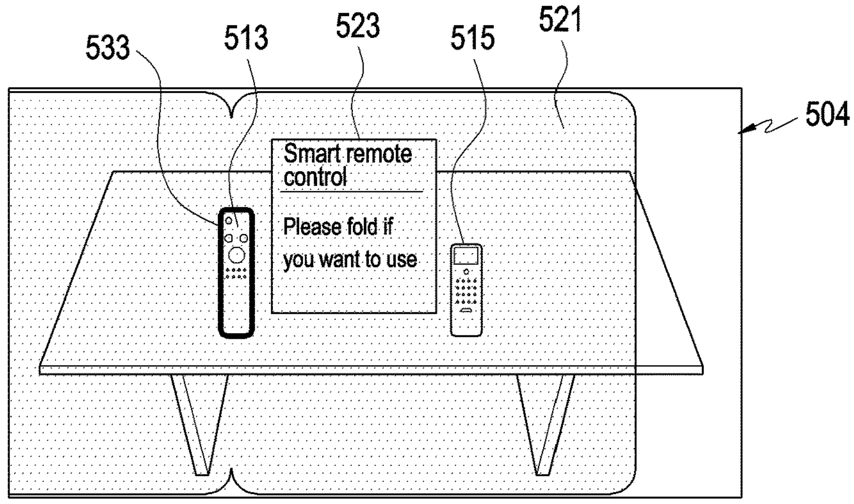
Figure 5B:
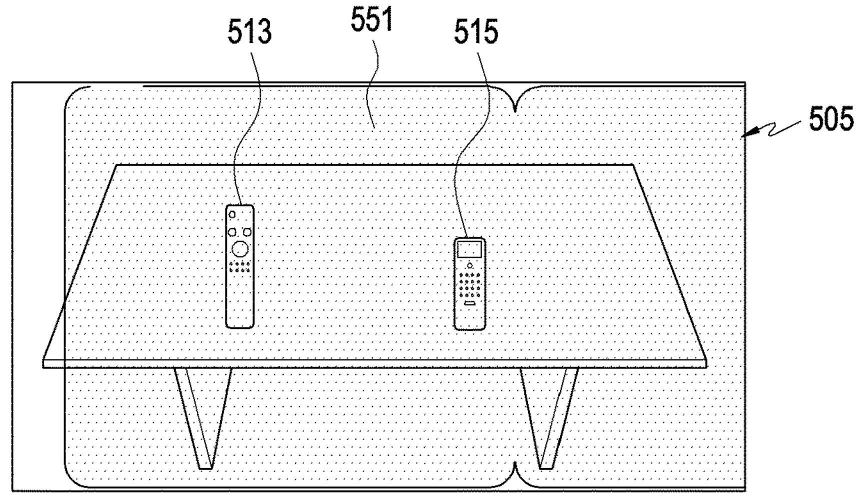
Figure 5B:
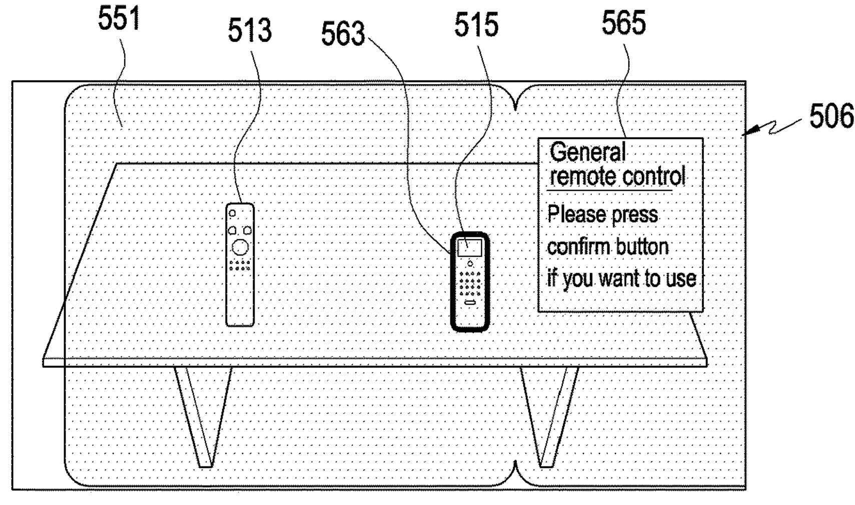

FIG. 5A and FIG. 5B are diagrams illustrating an example method for detecting a first remote control device according to various embodiments.

Referring to FIGS. 5A and 5B, in an embodiment, the processor 360 may detect that the electronic device 301 is worn on the user's body (e.g., the user's face) through the sensor 340 (e.g., a proximity sensor). In an embodiment, the processor 360, in the state where the electronic device 301 is worn on the user's body, may cause the electronic device 301 to enter a mode for controlling an external electronic device (hereinafter, also referred to as a "home control mode"), based on user input. In an embodiment, the electronic device 301 and the external electronic device may be registered in an IoT network. For example, the electronic device 301 may register, using an account of the user of the electronic device 301, an external electronic device capable of being controlled by the electronic device 301 through an IoT server (hereinafter, referred to as a "server") providing IoT services in association with a location (e.g., location) and/or a place (e.g., room) designated in the server. In an embodiment, if an external electronic device is registered in the IoT network, the processor 360 may cause the electronic device 301 to enter a mode for controlling a function of the registered external electronic device, based on user input.

In an embodiment, if the electronic device 301 enters the mode for controlling the function of the external electronic device, the processor 360 may obtain information about the external electronic device registered in the IoT server in association with the designated location and/or the designated place, and information about a remote control device for controlling the external electronic device. For example, if the electronic device 301 enters the mode for controlling the function of the external electronic device, the processor 360 may receive information about the external electronic device and information about the remote control device for controlling the external electronic device from the server through the communication module 310. The processor 360 may store, in the memory 350, the information about the external electronic device and information about the remote control device received from the server.

In an embodiment, information about the external electronic device may include a type, a name, and a model name of the external electronic device, a function performed by the external electronic device (e.g., a function of the external electronic device that is able to be performed by remote control), an operating state, information about a remote control device corresponding to the external electronic device, and/or an image of the external electronic device. In an embodiment, the image of the external electronic device may be used to detect the external electronic device.

In an embodiment, information about the remote control device may include a type, a name, and a model name of the remote control device, a function capable of being performed by the remote control device, information about an external electronic device to which the remote control device is dedicated, an operating state, and/or an image of the remote control device. In an embodiment, the image of the remote control device may be used to detect the remote control device. For example, the image of the remote control device may be at least one image that is used for comparison with the image of the first remote control device in operation 401.

In an embodiment, the processor 360 may cause the electronic device to enter a mode (home control mode) for controlling a function of the external electronic device, as indicated by reference numeral 501. In an embodiment, reference numeral 501 may represent a view 511 of the user through the electronic device 301 (e.g., one or more transparent members 290-1 and 290-2 in FIG. 2). The view may include remote control device 1 (513) and remote control device 515 placed on a desk 517.

In an embodiment, reference numeral 502 may represent a view 521 of the user through the electronic device 301 when the gaze of the user wearing the electronic device 301 moves (e.g., when the user wearing the electronic device moves his head to the left).

In an embodiment, in reference numeral 503, the processor 360 may detect remote control device 1 (513) located in a range corresponding to the user's gaze. For example, the processor 360 may identify that remote control device 1 (513) exists in a range corresponding to the user's gaze for a specified period of time (e.g., when the user's gaze is fixed on the remote control device 513 for a specified period of time). The processor 360, based on identifying that remote control device 1 (513) exists in a range corresponding to the user's gaze for a specified period of time, may perform an operation of detecting remote control device 1 (513). The processor 360 may display an indication 533 (e.g., a virtual line indicating the outer boundary of remote control device 1 (513)) indicating that remote control device 1 (513) is detected (or that an operation of detecting remote control device 1 (513) is being performed) through the display module 330. However, the disclosure is not limited thereto, and, in addition to or as an alternative of the indication 533, the processor 360 may output audio indicating that remote control device 1 (513) is detected (or that an operation of detecting remote control device 1 (513) is being performed) through the speaker.

In an embodiment, in reference numeral 504, if remote control device 1 (513) located in a range corresponding to the user's gaze is detected, the processor 360 may display, on the display module 330, information 523 about remote control device 1 (513) together with the indication 533. However, the disclosure is not limited thereto, and, in addition to or as an alternative of the information 523, the processor 360 may output audio indicating information 523 about remote control device 1 (513) through the speaker.

In an embodiment, reference numeral 505 may indicate a view 551 of the user through the electronic device 301 when the gaze of the user wearing the electronic device 301 moves (e.g., when the user wearing the electronic device 301 moves his head to the right).

In an embodiment, in reference numeral 506, the processor 360 may detect remote control device 2 (515) located in a range corresponding to the user's gaze. For example, the processor 360 may identify that remote control device 2 (515) exists in the range corresponding to the user's gaze for a specified period of time. The processor 360, based on identifying that remote control device 2 (515) exists in the range corresponding to the user's gaze for a specified period of time, may perform an operation of detecting remote control device 2 (515). The processor 360 may display an indication 563 (e.g., a virtual line indicating the outer boundary of remote control device 2 (515)) indicating that remote control device 2 (515) is detected (or that an operation of detecting remote control device 2 (515) is being performed) through the display module 330. However, the disclosure is not limited thereto, and, in addition to or as an alternative of the indication 563, the processor 360 may output audio indicating that remote control device 2 (515) is detected (or that an operation of detecting remote control device 2 (515) is being performed) through the speaker. In an embodiment, if remote control device 2 (515) located in the range corresponding to the user's gaze is detected, the processor 360 may display, on the display module 330, information 565 about remote control device 2 (515) together with the indication 563. However, the disclosure is not limited thereto, and, in addition to or as an alternative of the information 565, the processor 360 may output audio indicating information 565 about remote control device 2 (515) through the speaker.

Referring back to FIG. 4, in operation 403, in an embodiment, the processor 360 may establish a connection with the first remote control device through the communication module 310. For example, the processor 360 may establish a connection to receive, from the first remote control device, a command by a user input to the first remote control device. Hereinafter, a method for establishing a connection with the first remote control device will be described in greater detail with reference to FIGS. 6 and 7.

Figure 6:
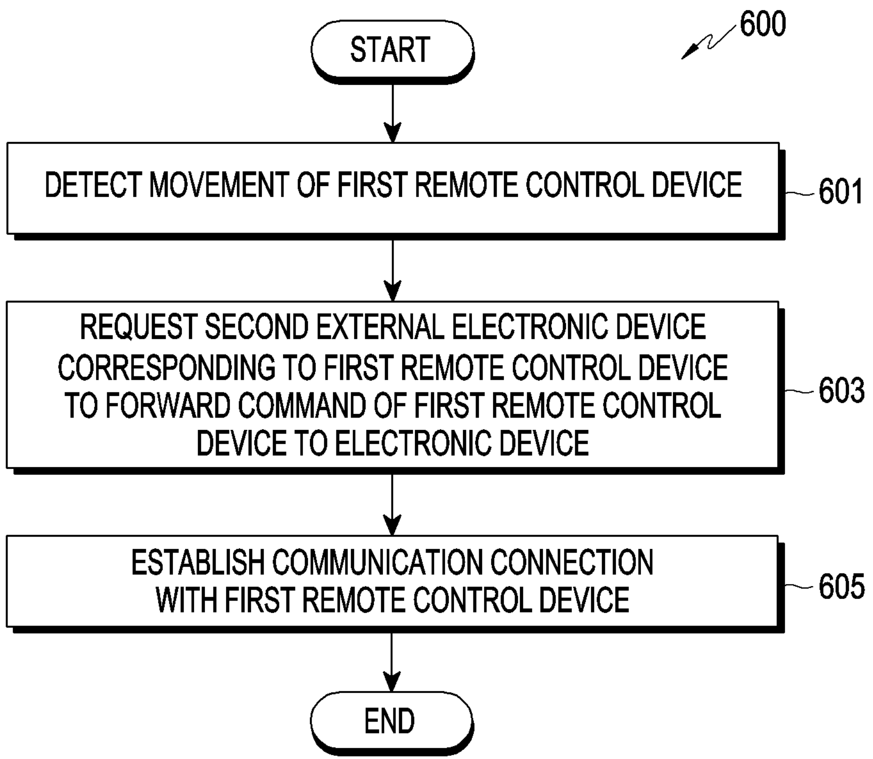
FIG. 6 is a flowchart illustrating an example method for establishing a connection with a first remote control device according to various embodiments.

FIG. 6 is a flowchart 600 illustrating an example method of establishing a connection with a first remote control device according to various embodiments.

Figure 7:
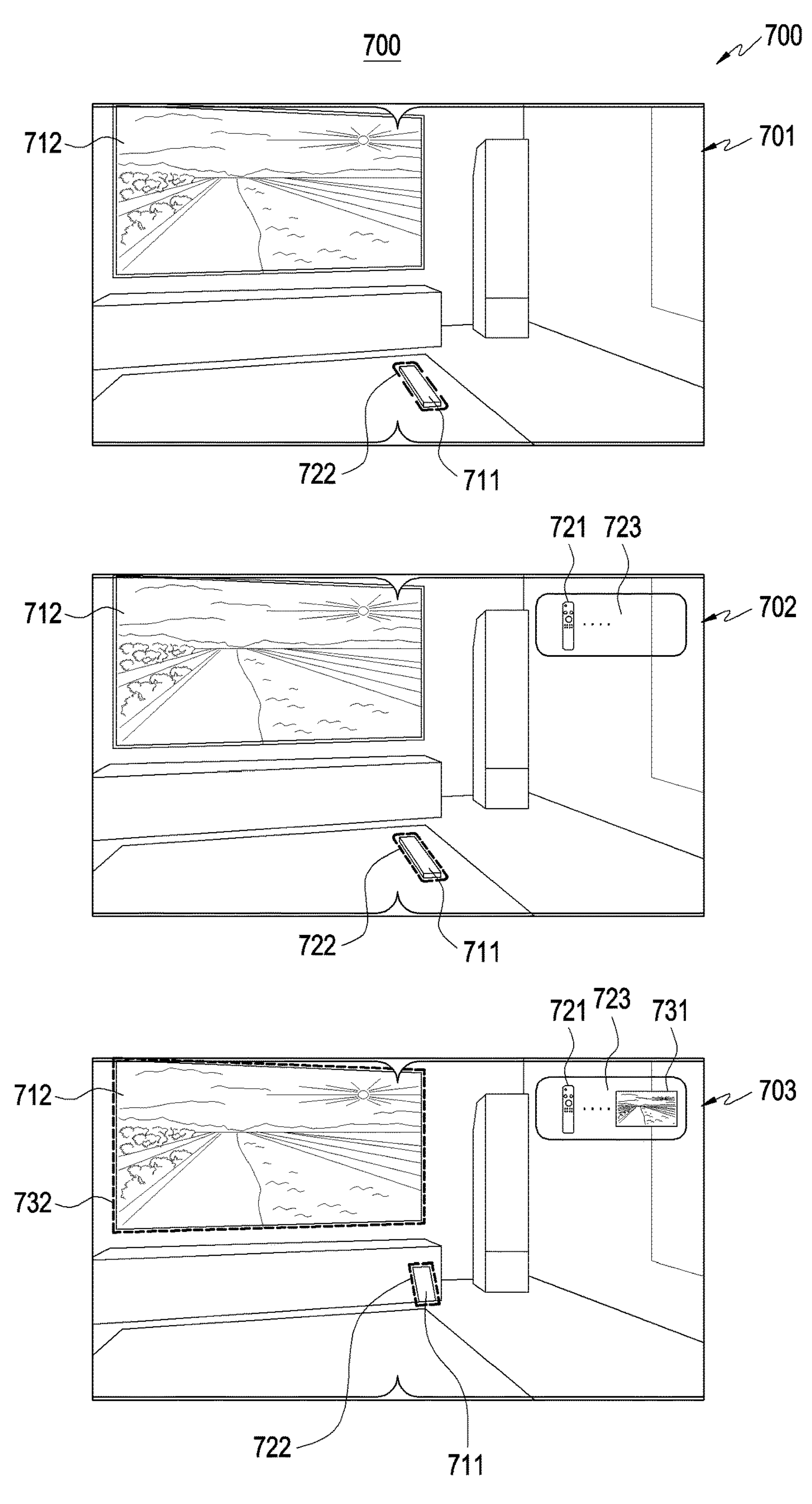
FIG. 7 is a diagram illustrating an example method for establishing a connection with a first remote control device according to various embodiments.

FIG. 7 is a diagram 700 illustrating an example method of establishing a connection with a first remote control device according to various embodiments.

Referring to FIGS. 6 and 7, in operation 601, in an embodiment, the processor 360 may detect movement of the first remote control device.

In an embodiment, the processor 360 may detect the movement of the first remote control device, based on a plurality of images sequentially obtained through the camera module 320.

In an embodiment, if the electronic device 301 and the first remote control device are in communication connection, the processor 360 may detect the movement of the first remote control device, based on information received from the first remote control device. For example, the first remote control device may detect the movement of the first remote control device through a motion sensor (e.g., an acceleration sensor) included in the first remote control device. The processor 360 may detect the movement of the first remote control device by obtaining information about the movement of the first remote control device detected in the first remote control device from the first remote control device through the communication module 310.

In an embodiment, the processor 360 may detect a user gesture of gripping the first remote control device. For example, the processor 360 may detect a user gesture of gripping the first remote control device, based on an image obtained through the camera module 320.

In an embodiment, the processor 360 may detect a user gesture of gripping the first remote control device and movement of the first remote control device.

In an embodiment, if movement of the first remote control device is detected (and/or when a user gesture of gripping the first remote control device is detected), the processor 360 may output information indicating the first remote control device. For example, as indicated by reference numeral 701, if the first remote control device 711 is moved, the processor 360 may display an indication 722 indicating the first remote control device through the display module 330. For example, as indicated by reference numeral 701, if the first remote control device 711 is moved, the processor 360 may output, through the speaker, audio indicating that the first remote control device 711 is moved.

In operation 603, in an embodiment, the processor 360 may request a second external electronic device corresponding to the first remote control device to forward a command of the first remote control device to the electronic device 301. For example, if the movement of the first remote control device is detected, the processor 360 may request that a second external electronic device corresponding to the first remote control device forwards a command of the first remote control device to the electronic device 301.

In an embodiment, the second external electronic device corresponding to the first remote control device may be an external electronic device (hereinafter, referred to as a "second external electronic device") to which the first remote control device is configured to be dedicated. For example, if the first remote control device is configured to be dedicated to TV control, the second external electronic device may be a TV. However, the disclosure is not limited thereto. For example, the second external electronic device may include an external electronic device that is currently controlled by a user input to the first remote control device.

In an embodiment, if a user input for selecting a button of the first remote control device is input to the first remote control device, the processor 360 may transmit, to the second external electronic device, a request (hereinafter, also referred to as a "command delivery request") to cause the second external electronic device, receiving a command corresponding to the user input, to transmit the command to the electronic device 301. For example, the processor 360 may transmit a command delivery request to a server (e.g., an IoT server where the electronic device 301 and the second external electronic device are registered) through the communication module 310. The server may transmit the received command delivery request to the second external electronic device.

In an embodiment, if the second external electronic device receives a command corresponding to the user input from the first remote control device as the command delivery request is transmitted to the second external electronic device, the processor 360 may cause the second external electronic device not to perform a function corresponding to the received command. In an embodiment, in the case of receiving a command delivery request from the server, the second external electronic device may be in a standby state in which the second external electronic device does not perform, even if the second external electronic device receives a command corresponding to the user input from the first remote control device, a function corresponding to the received command.

In operation 605, in an embodiment, the processor 360 may establish a communication connection with the first remote control device.

In an embodiment, the processor 360 may establish a communication connection with the first remote control device, based on a user input to the first remote control device. In an embodiment, the user input to the first remote control device may include a designated user input for establishing a communication connection between the electronic device and the first remote control device.

In an embodiment, the first remote control device may obtain a designated user input including a user input for selecting a designated button of the first remote control device (e.g., a button associated with identification of a function), a designated movement of the first remote control device, and/or a designated voice input of the user. The first remote control device may transmit a command corresponding to the designated user input to the second external electronic device. The second external electronic device may transmit a command corresponding to the designated user input received from the first remote control device to the server. The server may transmit the command corresponding to the designated user input received from the second external electronic device to the electronic device 301. The processor 360 may receive the command corresponding to the designated user input from the server through the communication module 310. The processor 360, based on receiving the command corresponding to the designated user input, may establish a communication connection between the electronic device and the first remote control device.

In an embodiment, the processor 360 may control the communication module 310 so that the communication module 310 establishes a communication connection between the electronic device 301 and the first remote control device. For example, in the case where the first remote control device is a device capable of connecting to the electronic device 301 using short-range wireless communication (e.g., Bluetooth or Wi-Fi) (e.g., in the case where the first remote control device includes a short-range wireless communication module 310), the processor 360, based on receiving the command corresponding to the designated user input, may control the short-range wireless communication module so that the short-range wireless communication module establishes a communication connection between the electronic device 301 and the first remote control device. In an embodiment, in the case where a communication connection is established between the electronic device and the first remote control device, the processor 360 may control the first remote control device and/or the second external electronic device such that the communication connection established between the first remote control device and the second external electronic device is released.

In an embodiment, in the case where the first remote control device is a device (e.g., a remote control) configured to control the second external electronic device using infrared (IR) communication or radio frequency (RF) communication, the processor 360 may perform configuration such that the electronic device 301 receives a command corresponding to a user input to the first remote control device via the second external electronic device and the server. For example, if a user input for a command is input to the first remote control device, the processor 360 may perform configuration such that the first remote control device transmits the command to the second external electronic device, such that the second external electronic device transmits the command to the server, and such that the server transmits the command to the electronic device 301.

In an embodiment, if the communication connection with the first remote control device is established, the processor 360 may output information indicating that the communication connection with the first remote control device is established. For example, the processor 360, as indicated by reference numeral 702, may display, through the display module 330, a virtual image 721 indicating the first remote control device in a designated area 723 of the transparent member (e.g., the upper right area of the transparent member) as information indicating that the communication connection with the first remote control device is established. For example, the processor 360 may output audio indicating that the communication connection with the first remote control device is established through the speaker, in addition to the virtual image 721.

In an embodiment, the processor 360 may output information indicating a second external electronic device corresponding to the first remote control device, if the communication connection with the first remote control device is established. For example, as indicated by reference numeral 703, the processor 360 may display, through the display module 330, a virtual image 731 indicating the second external electronic device 712 corresponding to the first remote control device 711 within a designated area 723 of the transparent member and an indication 732 indicating the second external electronic device 712 within the view for a designated period of time (or temporarily). For example, as indicated by reference numeral 703, if the second external electronic device 712 exists in the range corresponding to the user's gaze, the processor 360 may display, through the display module 330, a virtual image 731 indicating the second external electronic device 712 corresponding to the first remote control device 711 within a designated area 723 of the transparent member and an indication 732 indicating the second external electronic device 712 within the view, in order to indicate that the second external electronic device 712 is controllable by the first remote control device 711 (e.g., to indicate that the second external electronic device 712 may be determined as the first external electronic device to be described later).

Referring back to FIG. 4, in operation 405, in an embodiment, the processor 360 may determine the first external electronic device to be controlled using the first remote control device. For example, the processor 360 may determine an external electronic device (hereinafter referred to as a "first external electronic device") to perform a function, based on a command corresponding to a user input to the first remote control device.

In operation 407, in an embodiment, the processor 360 may control the communication module 310 such that the communication module 310 establishes a communication connection between the electronic device 301 and the first external electronic device. However, if the communication connection between the electronic device 301 and the first external electronic device has been already established, operation 407 may not be performed.

Hereinafter, the operation of determining the first external electronic device in operation 405 and the method of establishing the communication connection with the first external electronic device in operation 407 will be described in greater detail with reference to FIGS. 8, 9, 10 and 11.

Figure 8:
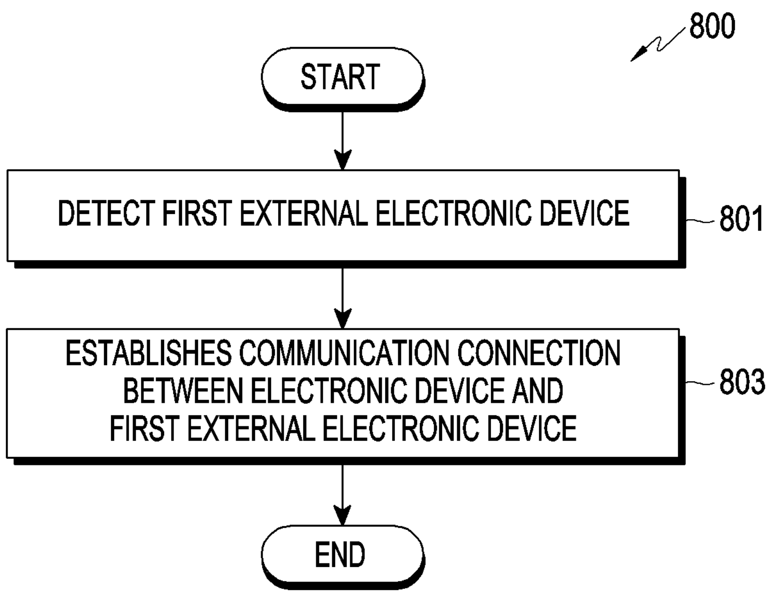
FIG. 8 is a flowchart illustrating an example method for determining a first external electronic device according to various embodiments.

FIG. 8 is a flowchart 800 illustrating an example method of determining a first external electronic device according to various embodiments.

Figure 9:
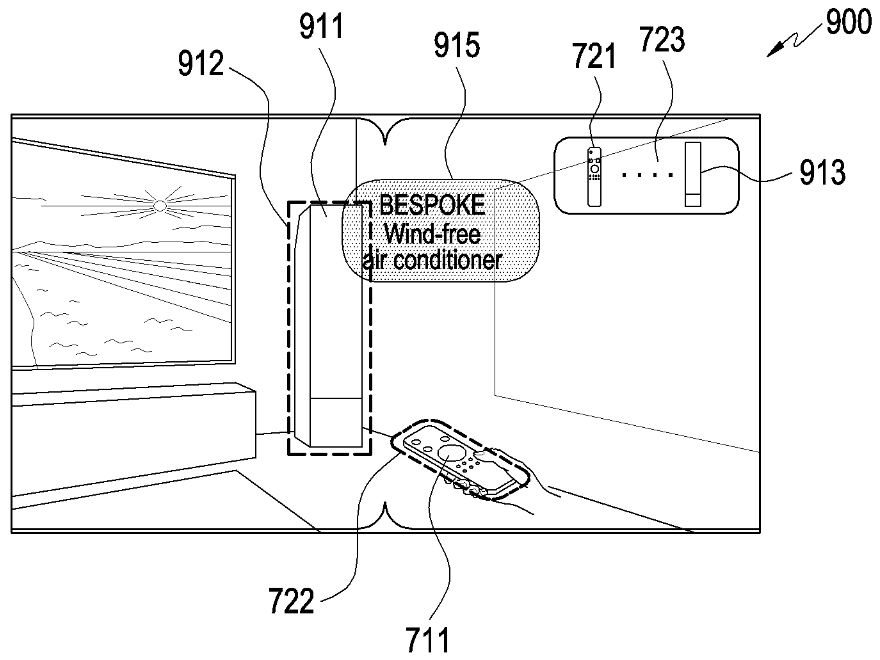
FIG. 9 is a diagram illustrating an example method for determining a first external electronic device according to various embodiments.

FIG. 9 is a diagram 900 illustrating an example method of determining a first external electronic device according to various embodiments.

Referring to FIGS. 8 and 9, in operation 801, in an embodiment, the processor 360 may detect a first external electronic device.

In an embodiment, the processor 360 may detect the gaze of a user wearing the electronic device through the camera module 320 (e.g., one or more second cameras 212-1 and 212-2 in FIG. 2). The processor 360 may obtain an image of the first external electronic device located in a range (e.g., view) corresponding to the gaze of the user through the camera module 320 (e.g., one or more first cameras 211-1 and 211-2 in FIG. 2). The processor 360 may compare the obtained image with a plurality of images stored in the memory 350 and including external electronic devices, thereby detecting the first external electronic device. The processor 360 may detecting the first external electronic device to obtain information about the first external electronic device (e.g., a type, name, model name of the first external electronic device, a function performed by the first external electronic device, and an operating state) from the memory 350.

In an embodiment, the processor 360 may obtain an image about the first external electronic device located in a range of field of view of the camera module 320 (e.g., a designated area from the center of the field of view of the camera module 320) through the camera module 320 (e.g., one or more first cameras 211-1 and 211-2 in FIG. 2). The processor 360 may compare the obtained image with a plurality of images stored in the memory 350 and including external electronic devices, thereby detecting the first external electronic device. The processor 360 may obtain information about the first external electronic device from the memory 350 by detecting the first external electronic device.

Although the above examples show that the processor 360 detects the first external electronic device, based on the image obtained through the camera module 320, the disclosure is not limited thereto. For example, the processor 360 may detect the first external electronic device located in the direction in which the electronic device is facing through the communication module 310 (e.g., ultra-wideband (UWB) communication module 310).

In an embodiment, if the first external electronic device is detected, the processor 360 may output information indicating that the first external electronic device is detected. For example, in FIG. 9, if an air conditioner 911 is detected as the first external electronic device, the processor 360 may display an indication 912 indicating that the air conditioner 911 is detected through the display module 330. For example, in FIG. 9, if an air conditioner 911 is detected as the first external electronic device, the processor 360 may display information 915 about the air conditioner 911 (e.g., a model name and a name of the air conditioner 911) along with an indication 912 indicating that the air conditioner 911 is detected through the display module 330. For example, if an air conditioner 911 is detected as the first external electronic device, the processor 360 may output audio indicating that the air conditioner 911 is detected through the speaker.

In an embodiment, if the first external electronic device is detected, the processor 360 may output information indicating that the first external electronic device is controllable using the first remote control device. For example, in FIG. 9, if the air conditioner 911 is detected as the first external electronic device, the processor 360 may display a virtual image 913 indicating the air conditioner 911 in a designated area 723 of the transparent member (e.g., the upper right area of the transparent member) to indicate that the air conditioner 911 is controllable using the first external electronic device 711.

In an embodiment, the processor 360 may output audio through the speaker for different periods of time, based on whether the first external electronic device is currently a control target using the electronic device 301 and the first remote control device. For example, if the first external electronic device is currently a control target using the first remote control device, the processor 360 may output audio (e.g., a connection sound to be output for a first time) through the speaker for a first time. If the first external electronic device is an air conditioner 911 detected in operation 801 (e.g., if the first external electronic device is not currently a control target using the first remote control device), the processor 360 may output audio (e.g., a connection sound to be output for a second time) through the speaker for a second time longer than the first time.

In operation 803, in an embodiment, the processor 360 may control the communication module 310 such that the communication module 310 establishes a communication connection between the electronic device and the first external electronic device. However, if the communication connection between the electronic device and the first external electronic device has been already established, the operation of establishing a communication connection between the electronic device and the first external electronic device in operation 803 may not be performed. In this case, the processor 360 may determine the first external electronic device detected in operation 801 as a control target using the first remote control device.

In an embodiment, in the state where the first external electronic device is detected, the processor 360, based on a designated user input to the electronic device 301 (or the first remote control device), may control short-range communication module (e.g., a Bluetooth module or a Wi-Fi module) such that the short-range communication module establishes a communication connection between the electronic device 301 and the first external electronic device. For example, in the state where the first external electronic device is detected, the processor 360, based on a designated user input to the electronic device 301 (or the first remote control device), may perform configuration such that the command transmitted from the electronic device 301 is transmitted to the first external electronic device via the server.

In an embodiment, although the above examples illustrates that the communication connection between the electronic device 301 and the first external electronic device is established based on a designated user input to the electronic device 301 (or the first remote control device), the disclosure is not limited thereto. For example, based on detecting that the first external electronic device exists within a range corresponding to the user's gaze for a specified period of time after the first external electronic device is detected in operation 801, the processor 360 may control the communication module 310 such that the communication module 310 establishes a communication connection between the electronic device 301 and the first external electronic device.

Figure 10:
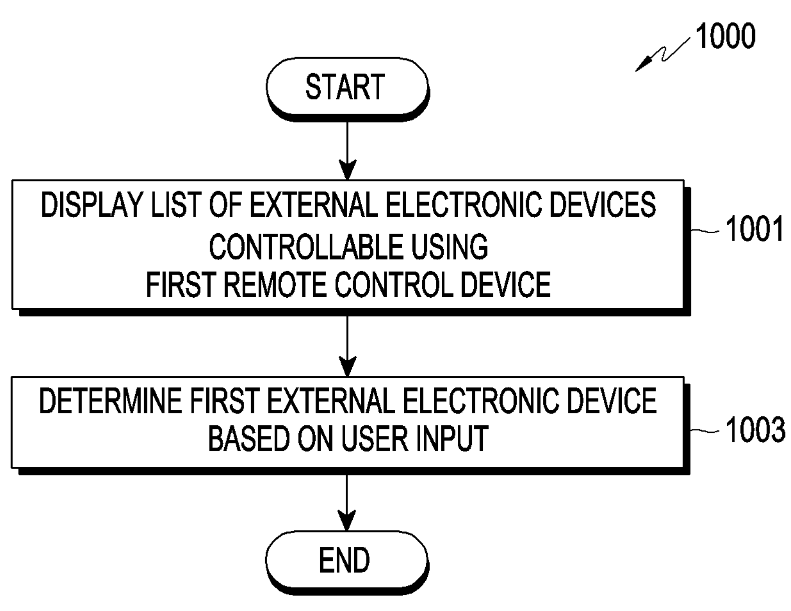
FIG. 10 is a flowchart illustrating an example method for determining a first external electronic device according to various embodiments.

FIG. 10 is a flowchart 1000 illustrating an example method of determining a first external electronic device according to various embodiments.

Figure 11:
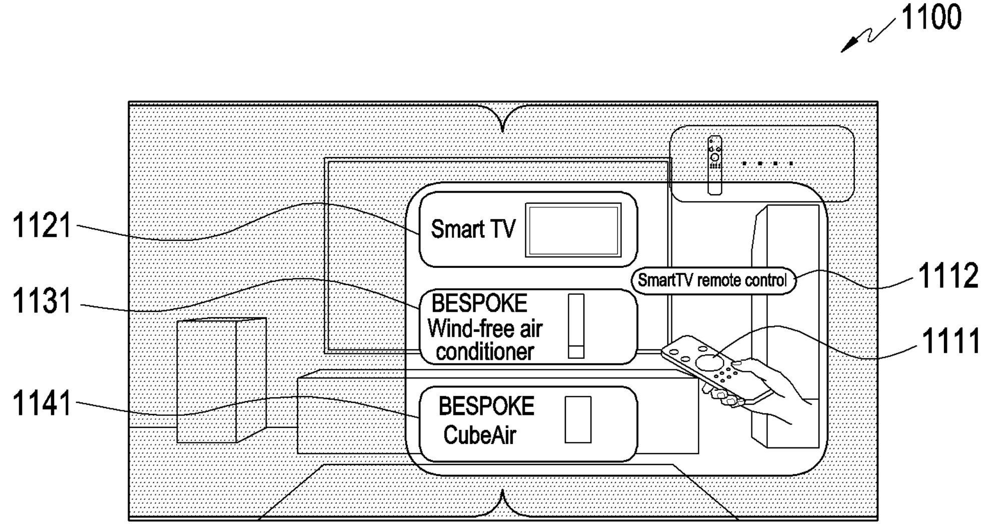
FIG. 11 is a diagram illustrating an example method for determining a first external electronic device according to various embodiments.

FIG. 11 is a diagram 1100 illustrating an example method of determining a first external electronic device according to various embodiments.

Referring to FIG. 10 and FIG. 11, in operation 1001, in an embodiment, the processor 360 may display a list of external electronic devices that are controllable using the first remote control device through the display module 330. For example, in the case where a communication connection with the first remote control device is established, the processor 360 may display a list of external electronic devices controllable using the first remote control device through the display module 330.

In an embodiment, the external electronic devices included in the list may include external electronic devices capable of performing a function using the first remote control device through the mapping in operation 409 described below.

In an embodiment, in FIG. 11, if a communication connection with the first remote control device 1111 is established, the processor 360 may display, through the display module 330, information 1121 indicating a TV (e.g., a name of the TV and an image indicating the TV), information 1131 indicating an air conditioner (e.g., a name of the air conditioner and an image indicating the air conditioner), and information 1141 indicating an air purifier (e.g., a name of the air purifier and an image indicating the air purifier), which are controllable using the first remote control device 1111.

In an embodiment, in FIG. 11, if a communication connection with the first remote control device 1111 is established and if the first remote control device 1111 exists within a range corresponding to the user's gaze, the processor 360 may display, through the display module 330, information 1121 indicating a TV, information 1131 indicating an air conditioner, and information 1141 indicating an air purifier, which are controllable using the first remote control device 1111.

In an embodiment, the processor 360 may display, through the display module 330, information 1112 regarding the first remote control device 1111 that is in communication connection with the electronic device 301, as shown in FIG. 11.

In operation 1003, in an embodiment, the processor 360 may determine a first external electronic device, based on a user input, while displaying the list. For example, the processor 360, based on a user input, may select one of the external electronic devices included in the list. The processor 360 may determine the selected external electronic device as the first external electronic device.

In an embodiment, in FIG. 11, the processor 360 may select the air conditioner as the first external electronic device, based on a user input to the information 1131 indicating the air conditioner among the information 1121 indicating the TV, the information 1131 indicating the air conditioner, and the information 1141 indicating the air purifier. In an embodiment, although not shown in FIG. 10, if the first external electronic device is selected, the communication module 310 may be controlled such that the communication module 310 establishes a communication connection between the electronic device 301 and the first external electronic device.

Although FIG. 11 illustrates that the first external electronic device is selected based on a user input to a screen displayed on the display 330, the disclosure is not limited thereto. For example, the processor 360 may output a voice related to the screen, displayed through the display 330, through the speaker 343 and receive the user's voice through the microphone 342, thereby selecting the first external electronic device.

Referring back to FIG. 4, in operation 409, in an embodiment, the processor 360 may perform an operation of mapping at least one key of the first remote control device and at least one function of the first external electronic device.

In an embodiment, the processor 360 may identify at least one function of the first external electronic device, which is stored in the memory 350, if the electronic device 301 is in communication connection with the first external electronic device. The processor 360 may map at least one function of the first external electronic device and at least one key (e.g., a button of the first remote control device) of the first remote control device.

In an embodiment, if the electronic device 301 is in communication connection with the first external electronic device, the processor 360 may identify information about at least one key of a remote control device corresponding to the first external electronic device (e.g., a remote control dedicated to the first external electronic device), which is stored in the memory 350. For example, the processor 360 may identify functions of the first external electronic device respectively corresponding to a plurality of keys of the remote control dedicated to the first external electronic device. For example, the processor 360 may identify information about a mapping relationship (hereinafter referred to as a "mapping relationship") between a plurality of keys of the remote control dedicated to the first external electronic device and functions of the first external electronic device to be performed for the respective keys if a user input is received. In an embodiment, the processor 360, based on the information about at least one key of the remote control device corresponding to the first external electronic device, may map at least one function of the first external electronic device and at least one key of the first remote control device. For example, the processor 360, based on the mapping relationship, may remap (hereinafter also referred to as "remapping") a plurality of keys of a remote control dedicated to the first external electronic device, which were mapped to the functions of the first external electronic device, to a plurality of keys of the first remote control device. In an embodiment, the remapping operation may be an operation of causing, when an input to a key of the first remote control device is received, a command corresponding to a key of a remote control corresponding to the first external electronic device, which is mapped to the input key of the first remote control device, to be transmitted to the first external electronic device.

Hereinafter, a method for mapping at least one key of the first remote control device and at least one function of the first external electronic device will be described in greater detail with reference to FIGS. 12A, 12B, 13A, 13B, 14A, 14B, 14C and 15.

Figure 12A:
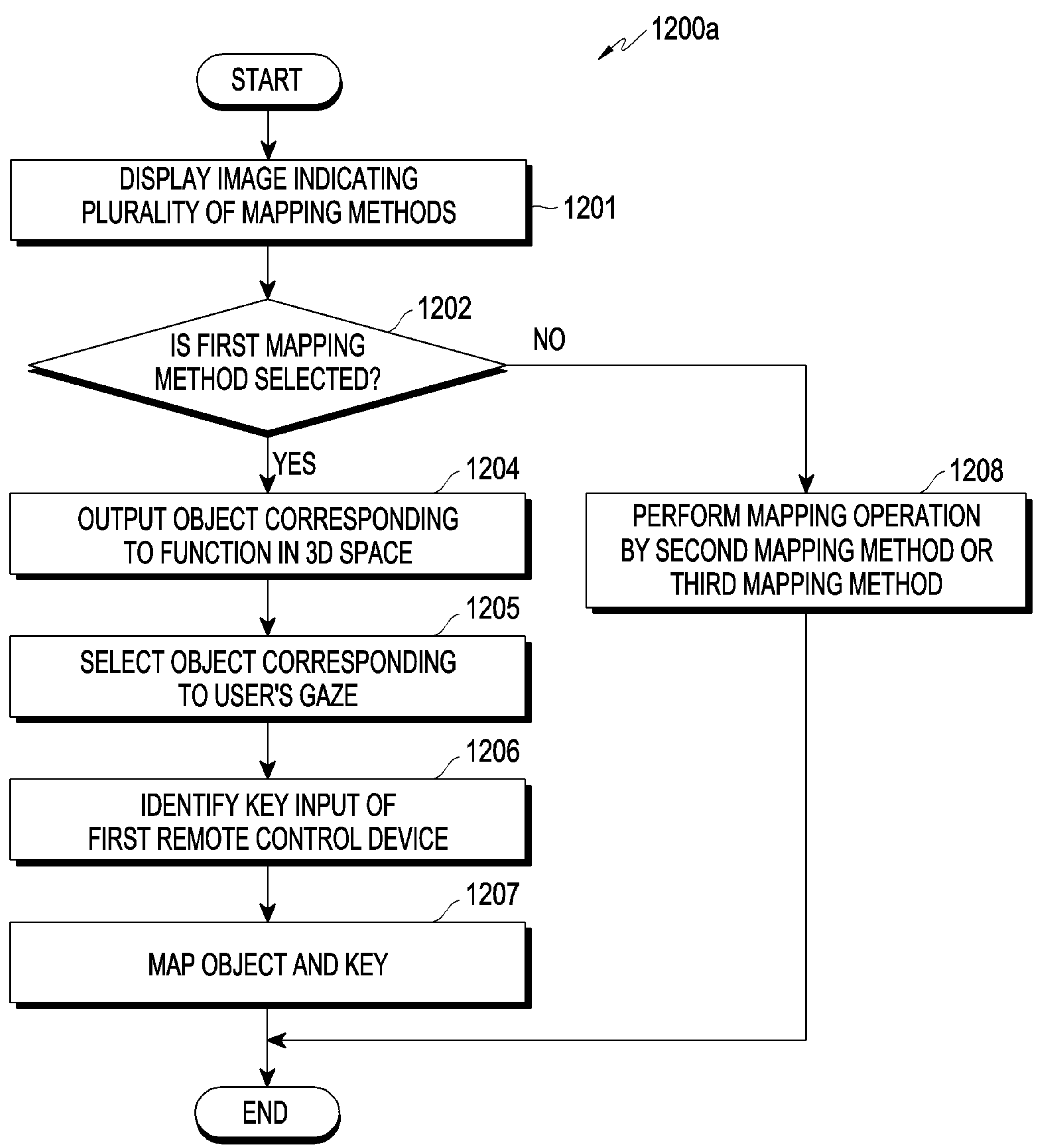
FIG. 12A is a flowchart illustrating an example method for mapping at least one key of a first remote control device and at least one function of a first external electronic device according to various embodiments.

FIG. 12A is a flowchart **1200*a*** illustrating an example method of mapping at least one key of a first remote control device and at least one function of a first external electronic device according to various embodiments.

Figure 12B:
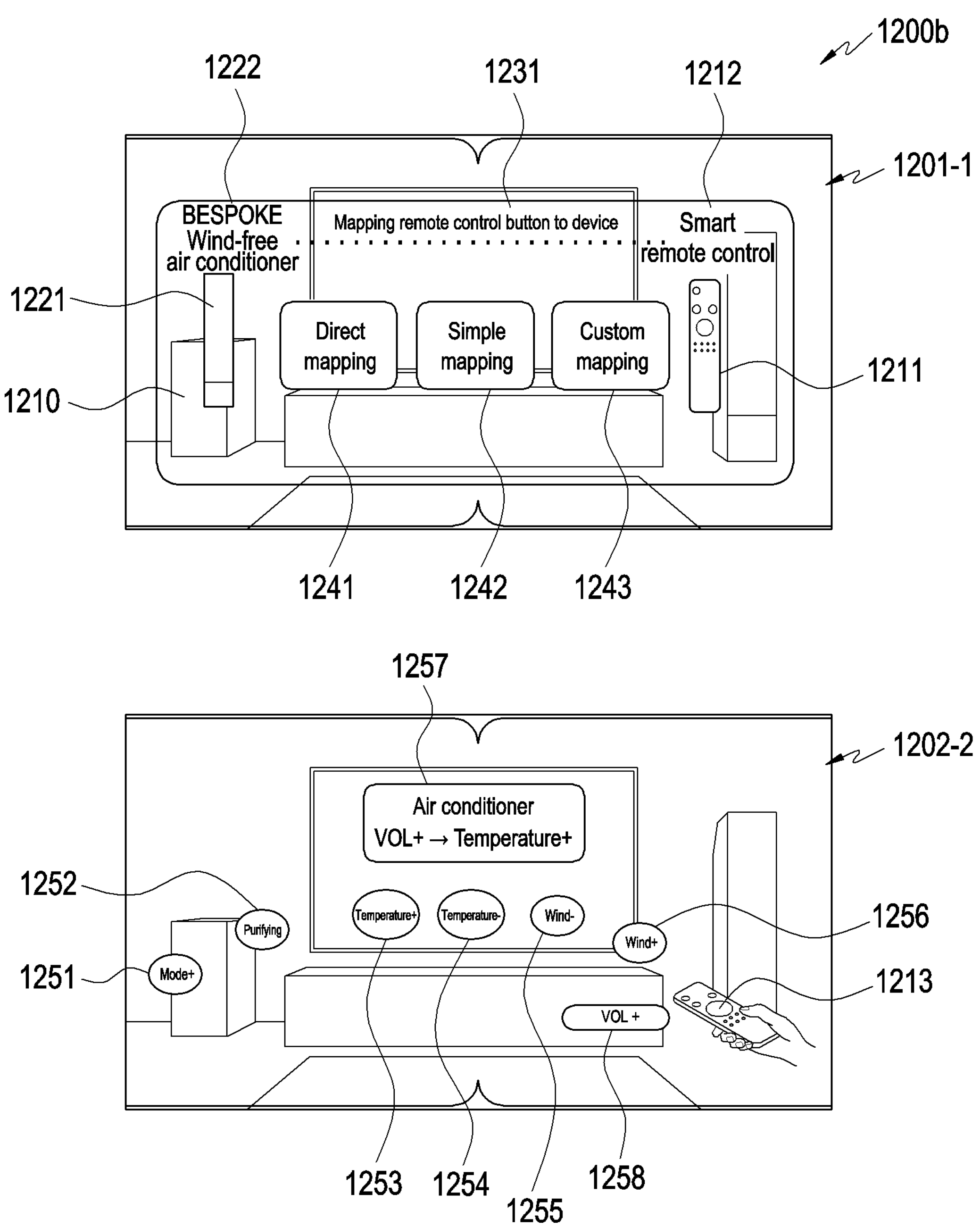
FIG. 12B is a diagram illustrating an example method for mapping at least one key of a first remote control device and at least one function of a first external electronic device according to various embodiments.

FIG. 12B is a diagram **1200*b*** illustrating an example method of mapping at least one key of a first remote control device and at least one function of a first external electronic device according to various embodiments.

Referring to FIGS. 12A and 12B, in operation 1201, in an embodiment, the processor 360 may display an image indicating a plurality of mapping methods through the display module 330. For example, in reference numeral 1201-1, if a communication connection with the first external electronic device is established, the processor 360 may display a virtual image 1210 for selecting a plurality of mapping methods through the display module 330. The virtual image 1210 may include information 1221 and 1222 indicating a first external electronic device, information 1211 and 1212 indicating a first remote control device 1213, and information 1231 indicating that a mapping operation is to be performed, and include an object 1241 corresponding to a first mapping method (hereinafter also referred to as "custom mapping"), an object 1242 corresponding to a second mapping method (hereinafter also referred to as "direct mapping"), and an object 1243 corresponding to a third mapping method (hereinafter also referred to as "simple mapping"). However, the disclosure is not limited thereto, and the virtual image 1210 may include only the object 1241 corresponding to the first mapping method, the object 1242 corresponding to the second mapping method, and the object 1243 corresponding to the third mapping method, excluding the information 1222 indicating the first external electronic device, the information 1211 indicating the first remote control device, and the information 1231 indicating that a mapping operation is to be performed.

In operation 1202, in an embodiment, the processor 360 may determine whether the first mapping method is selected from among a plurality of mapping methods.

In an embodiment, the processor 360 may select the first mapping method, based on a user input to the object 1243 corresponding to the first mapping method among the object 1243 corresponding to the first mapping method, the object 1242 corresponding to the second mapping method, and the object 1241 corresponding to the third mapping method.

In an embodiment, the first mapping method may be a method of mapping at least one key of the first remote control device and at least one function of the first external electronic device, based on a user input.

If the first mapping method is not selected from among the plurality of mapping methods in operation 1202, in an embodiment, the processor 360 may perform a mapping operation by the second mapping method or the third mapping method in operation 1208. The mapping operation performed by the second mapping method or the third mapping method will be described in greater detail below with reference to FIGS. 14 and 15.

If the first mapping method is selected from among the plurality of mapping methods in operation 1202, in an embodiment, the processor 360 may output an object corresponding to the function in a 3D space in operation 1204. For example, the processor 360 may display at least one object corresponding to at least one function of the first external electronic device through the display module 330 so that the at least one object is, to the user, viewable to be disposed in a three-dimensional space around the electronic device. For example, the processor 360 may display at least one object 1251, 1252, 1253, 1254, 1255, or 1256 corresponding to at least one function of the first external electronic device through the display module 330, as indicated by reference numeral 1202.

In operation 1205, in an embodiment, the processor 360 may select an object corresponding to the user's gaze.

In an embodiment, the processor 360 may select an object corresponding to the user's gaze (e.g., an object disposed in a direction to which the user's gaze is directed) from among the at least one object corresponding to at least one function of the first external electronic device. For example, the processor 360 may select an object 1254 corresponding to the user's gaze in reference numeral 1202.

In operation 1206, in an embodiment, the processor 360 may identify a key input of the first remote control device.

In an embodiment, after the object corresponding to the user's gaze is selected, the processor 360 may receive, from the first remote control device through the communication module 310, information about a key of the first remote control device into which the user input is input, which is to be mapped with a function of the first external electronic device corresponding to the object corresponding to the user's gaze.

In operation 1207, in an embodiment, the processor 360 may map the object and the key.

Based on the information, the processor 360 may map a function of the first external electronic device corresponding to the object corresponding to the user's gaze and a key of the first remote control device into which the user input is input. For example, in reference numeral 1202-2, if a user input to a key (e.g., a key configured to increase the volume of the second external electronic device to which the first remote control device is dedicated before detecting the first remote control device) is received from the first remote control device 1213 after the object 1254 corresponding to the user's gaze is selected, a function of the first external electronic device corresponding to the selected object 1243 (e.g., a function of reducing the configured temperature of an air conditioner) may be mapped to the key in which the user input is received. In an embodiment, as indicated by reference numeral 1202-2, if a user input to the key is received, the processor 360 may display information 1258 indicating a function configured for the key in which the user input is received (e.g., a function configured to increase the volume for the second external electronic device to which the first remote control device is dedicated before detecting the first remote control device) through the display module 330.

In an embodiment, the processor 360, after the function of the first external electronic device corresponding to the selected object and the key in which the user input is received are mapped, may reperform the mapping operation, based on the user input. For example, in reference numeral 1202-1, the processor 360 may map a function (e.g., a function of reducing the configured temperature of an air conditioner) of the first external electronic device corresponding to the selected object 1243 to a key in which the user input is received, and then, if an object 1253 other than the object 1243 is selected and if the key of the first remote control device is selected, map a function corresponding to the selected object 1253 and the selected key. In this case, the processor 360 may display, through the display module 330, information 1257 indicating that the function corresponding to the selected object 1253 and the selected key are mapped, as indicated by reference numeral 1202.

Although FIGS. 12A and 12B illustrate that the mapping operation is performed based on a user input to a screen (e.g., images indicating multiple mapping methods or an object corresponding to a function) displayed through the display 330, the disclosure is not limited thereto. For example, the processor 360 may output a voice related to a screen displayed through the display 330 through the speaker 343 and receive a user's voice through the microphone 342, thereby performing the mapping operation.

Figure 13A:
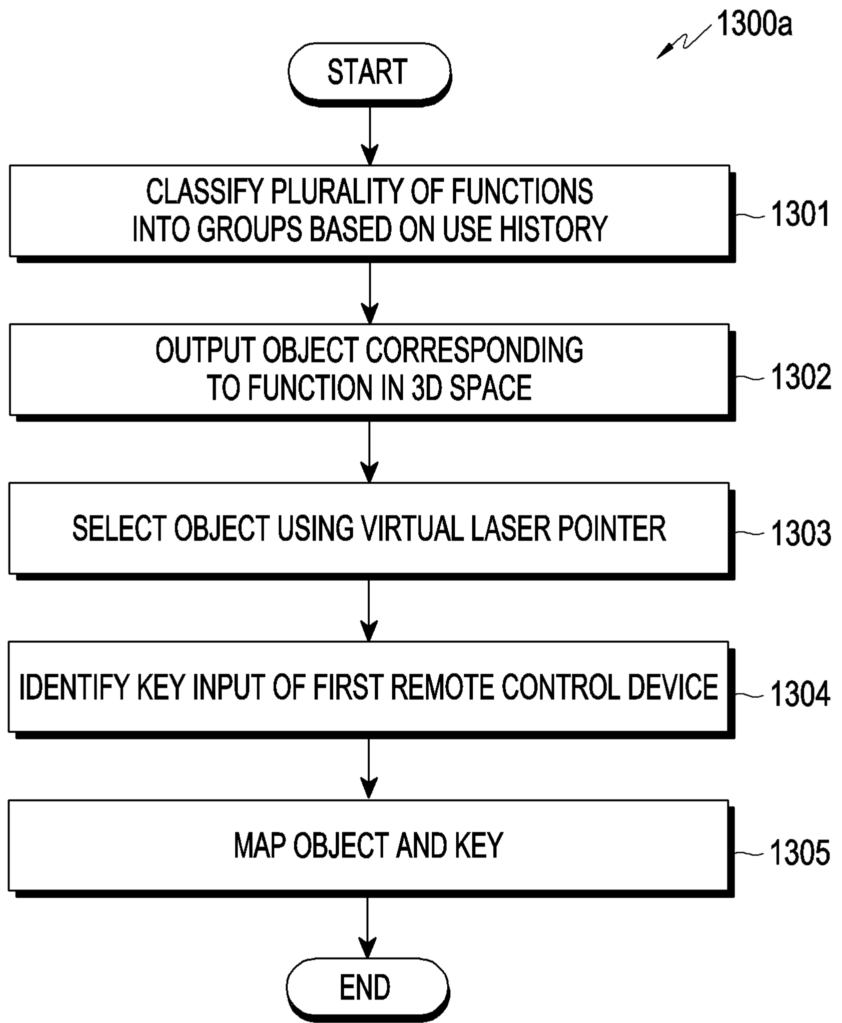
FIG. 13A is a flowchart illustrating an example method for mapping at least one key of a first remote control device and at least one function of a first external electronic device according to various embodiments

FIG. 13A is a flowchart 1300*a* illustrating an example method of mapping at least one key of a first remote control device and at least one function of a first external electronic device according to various embodiments.

Figure 13B:
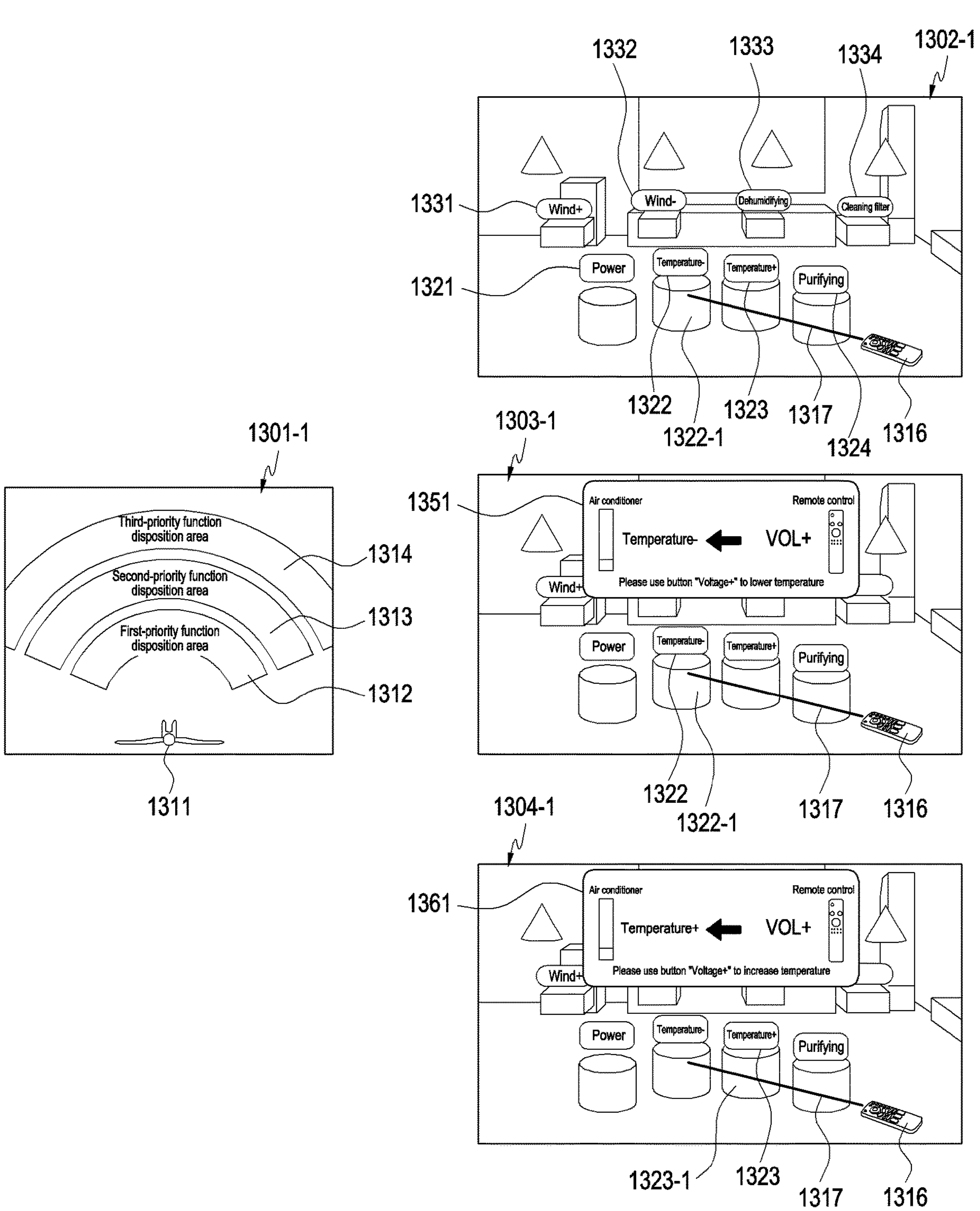
FIG. 13B is a diagram illustrating an example method for mapping at least one key of a first remote control device and at least one function of a first external electronic device according to various embodiments.

FIG. 13B is a diagram 1300*b* illustrating an example method of mapping at least one key of a first remote control device and at least one function of a first external electronic device according to various embodiments1.

Referring to FIG. 13A and FIG. 13B, in operation 1301, in an embodiment, the processor 360 may classify a plurality of functions into groups, based on use history.

In an embodiment, the processor 360 may classify a plurality of functions of the first external electronic device into groups having priorities (e.g., assigned priorities), based on use history of the plurality of functions of the first external electronic device. The processor 360 may receive information about use history of the plurality of functions of the first external electronic device (e.g., the number of times each of the plurality of functions of the first external electronic device is used during a specified period of time) from a server through the communication module 310. The processor 360 may classify the plurality of functions of the first external electronic device into groups having priorities in order of high use history of the plurality of functions of the first external electronic device, based on the received information.

In operation 1302, in an embodiment, the processor 360 may output an object corresponding to the function in a 3D space.

In an embodiment, the processor 360 may display the plurality of objects corresponding to the plurality of functions of the first external electronic device through the display module 330 according to the priorities of the groups so that the plurality of objects are, by the user, viewable to be disposed in a three-dimensional space around the electronic device. For example, the processor 360 may display the plurality of objects through the display module 330, based on the user of the electronic device (or the electronic device), so that an object having a higher priority is disposed in a space closer to the user. For example, as indicated by reference numeral 1301-1, the processor 360 may configure a first space 1312 (e.g., a first-priority function disposition area), a second space 1313 (e.g., a second-priority function disposition area), and a third space 1314 (e.g., a third-priority function disposition area), based on the user 1311. The processor 360 may display the plurality of objects through the display module 330 so that objects corresponding to functions belonging to a group of a first priority as the highest priority, objects corresponding to functions belonging to a group of a second priority as the next priority of the first priority, and objects corresponding to functions belonging to a group of a third priority as the next priority of the second priority are disposed to be visible to the use.

In an embodiment, as indicated by reference numeral 1302-1, in the case where the first external electronic device is an air conditioner, the processor 360 may display, through the display module 330, objects 1321, 1322, 1323, and 1324 corresponding to functions belonging to the first priority group, objects 1331, 1332, 1333, and 1334 corresponding to functions belonging to the second priority group, and objects corresponding to functions belonging to the third priority group, based on the priorities of the groups into which the functions of the air conditioner are classified.

In operation 1303, in an embodiment, the processor 360 may select an object using a virtual laser pointer.

In an embodiment, the processor 360 may select, from among the plurality of objects, an object positioned at a position pointed to by a virtual laser pointer that is visible to the user as being emitted from the first remote control device 1316. For example, in reference numeral 1302-1, as the direction to which the first remote control device 1316 is directed changes, the display of the virtual laser pointer 1317 visible to the user as being emitted from the first remote control device 1316 may change. The processor 360 may select an object 1322 corresponding to a virtual cylinder 1322-1 positioned at a position pointed to by the virtual laser pointer 1317, as indicated by reference numeral 1302-1. However, although reference numeral 1302-1 illustrates that the virtual cylinder 1322-1 corresponding to the object 1322 is displayed and the virtual cylinder 1322-1 is pointed to by the virtual laser pointer 1317, the disclosure is not limited thereto. For example, the object 1322 positioned at a position pointed to by the virtual laser pointer 1317 may be selected without displaying the virtual cylinder 1322-1.

In operation 1304, in an embodiment, the processor 360 may identify a key input of the first remote control device.

In operation 1305, in an embodiment, the processor 360 may map the object and the key.

In an embodiment, if a user input to a key of the first remote control device is received after an object is selected from among the plurality of objects, the processor 360 may map a function corresponding to the selected object and the key of the first remote control device in which the user input is received. For example, in reference numeral 1303-1, if a user input to a key of the first remote control device (e.g., a key configured to increase the volume of the second external electronic device to which the first remote control device is dedicated before detecting the first remote control device) is received after the object 1322 is selected, the processor 360 may map the object 1322 and the key. If the object 1322 and the key are mapped, the processor 360 may display information 1351 about the mapping between the object 1322 and the key through the display module 330.

In an embodiment, after a function of the first external electronic device corresponding to the selected object and the key in which the user input is received are mapped, the processor 360 may reperform a mapping operation, based on a user input. For example, in reference numeral 1304-1, after mapping a function (e.g., a function of reducing the configured temperature of an air conditioner) of the first external electronic device corresponding to the selected object 1322 to the key in which the user input is received, if the key of the first remote control device is selected and if an object 1323 other than the object 1322 (or a virtual cylinder 1323-1 corresponding to another object 1323) is selected using the virtual laser pointer 1317, the processor 360 may map a function corresponding to the selected object 1323 and the selected key. In this case, the processor 360 may display, through the display module 330, a function (e.g., a function of increasing the configured temperature of an air conditioner) corresponding to the selected object 1323 and information 1361 indicating that the selected key was mapped, as indicated by reference numeral 1304-1.

Although FIGS. 13A and 13B illustrate that the mapping operation is performed based on a user input to a screen (e.g., an object corresponding to a function and a virtual laser pointer) displayed through the display 330, the disclosure is not limited thereto. For example, the processor 360 may perform the mapping operation by outputting a voice related to a screen displayed through the display 330 through the speaker 343 and receiving a user's voice through the microphone 342.

Figure 14A:
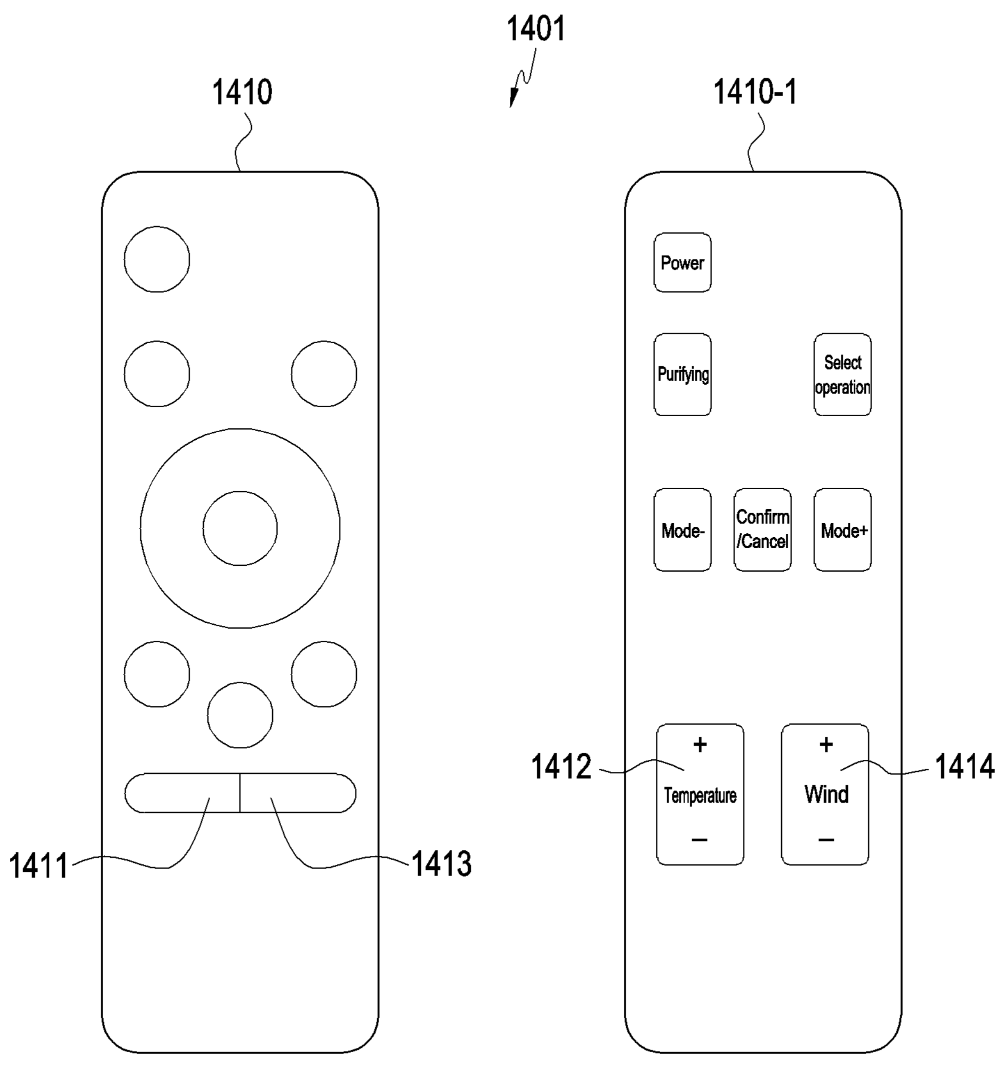
FIGS. 14A, 14B, and 14C are diagrams illustrating an example method for mapping at least one key of a first remote control device and at least one function of a first external electronic device using a second mapping method according to various embodiments.
Figure 14B:
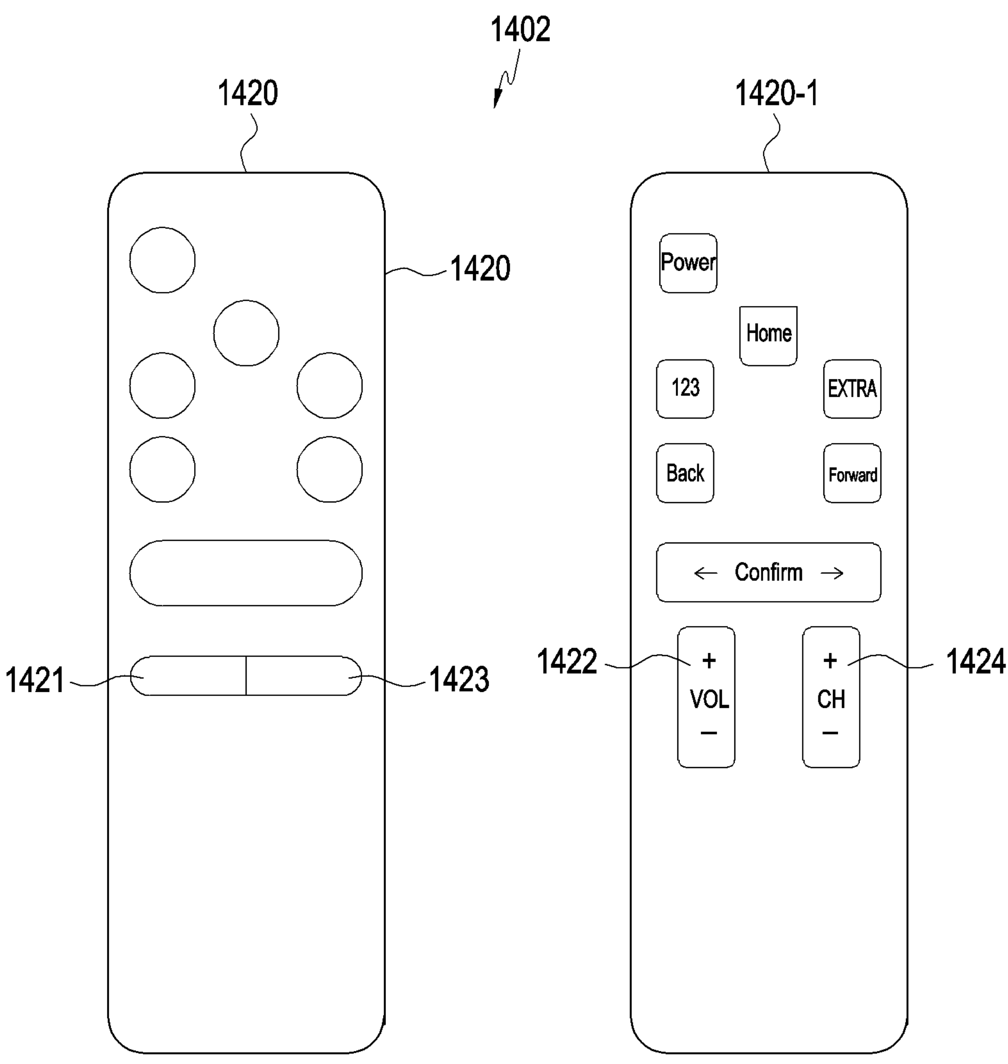
Figure 14C:
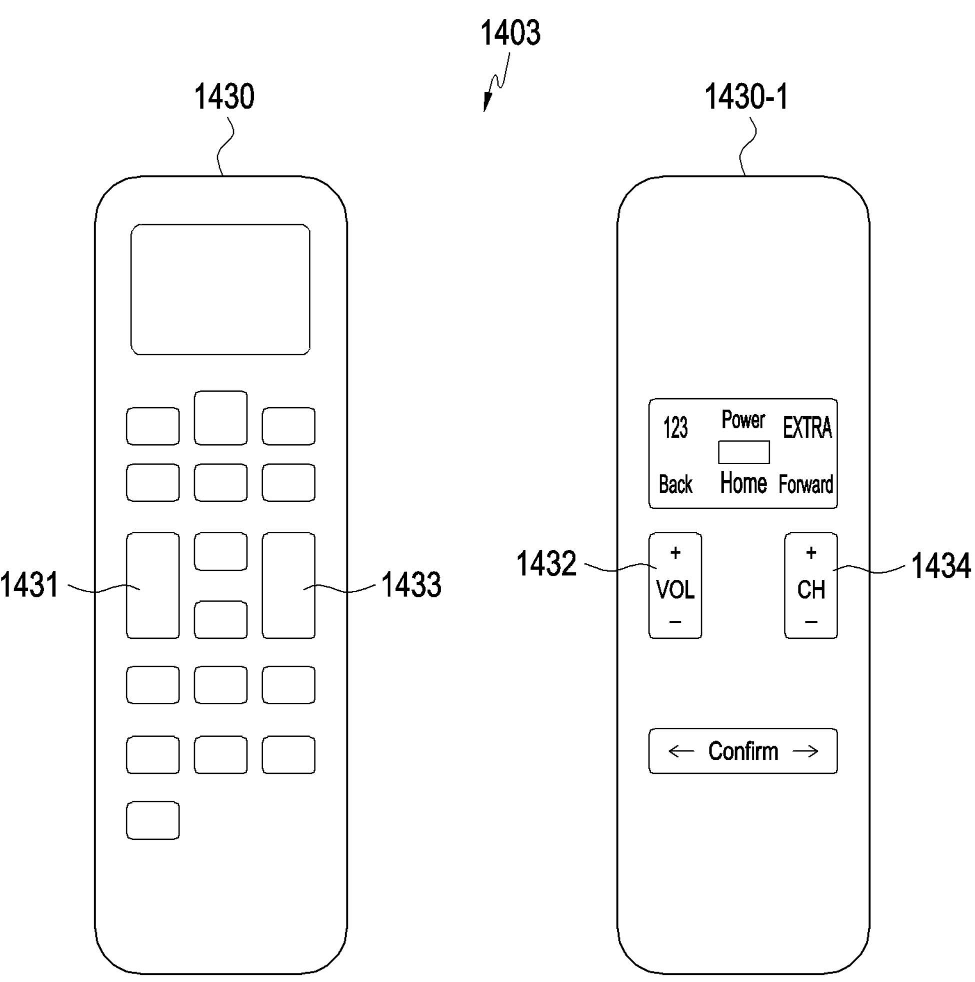

FIGS. 14A, 14B and 14C are diagrams 1401, 1402, and 1403 illustrating an example method for mapping at least one key of a first remote control device and at least one function of a first external electronic device using a second mapping method according to various embodiments.

Referring to FIGS. 14A, 14B and 14C (which may be referred to as FIGS. 14A to 14C), in an embodiment, the second mapping method may be a method of mapping at least one key of the first remote control device and at least one function of the first external electronic device using a designated mapping (or a designated mapping relationship). For example, in the second mapping method, the mapping between at least one key of the first remote control device and at least one function of the first external electronic device may be specified (or configured) in advance by a developer of an application for controlling the external electronic device using the remote control device. In an embodiment, the designated mapping between at least one key of the first remote control device and at least one function of the first external electronic device may be stored in a server. The processor 360 may receive, from the server through the communication module 310, a designated mapping between at least one key of the first remote control device and at least one function of the first external electronic device. The processor 360 may store, in the memory 350, the designated mapping between at least one key of the first remote control device and at least one function of the first external electronic device received from the server.

In an embodiment, in FIG. 14A, in the case where the first remote control device is a TV remote control 1410, a virtual image 1410-1 including a plurality of keys of an air conditioner remote control, which are mapped to a plurality of keys of the TV remote control 1410, may be displayed on the TV remote control 1410 by the second mapping method. For example, in FIG. 14A, a volume control key 1411 of the TV remote control 1410 may be remapped to a temperature control key of the air conditioner remote control (or mapped to a temperature control function of the air conditioner). For example, in FIG. 14A, a channel switching key 1413 of the TV remote control 1410 may be remapped to a wind speed control key of the air conditioner remote control (or mapped to a wind speed control function of the air conditioner). In an embodiment, in FIG. 14A, if mapping is performed between at least one key of the first remote control device and at least one function of the first external electronic device, the processor 360 may display, through the display module 330, an object (e.g., an object 1412 indicating a temperature control key of the air conditioner remote control or an object 1414 indicating a wind speed control key of the air conditioner remote control) corresponding to at least one function of the first external electronic device on at least one key of the first remote control device.

In an embodiment, in FIG. 14B, in the case where the first remote control device is an air conditioner remote control 1420 (e.g., an air conditioner remote control supporting Bluetooth), a virtual image 1420-1 including a plurality of keys of a TV remote control, which are mapped to a plurality of keys of the air conditioner remote control 1420, may be displayed on the air conditioner remote control 1420 by the second mapping method. For example, in FIG. 14B, a temperature control key 1421 of the air conditioner remote control 1420 may be remapped to a volume control key 1422 of the TV remote control. For example, in FIG. 14B, a wind speed control key 1423 of the air conditioner remote control 1420 may be remapped to a channel switching key 1424 of the TV remote control. In an embodiment, in FIG. 14B, if mapping is performed between at least one key of the first remote control device and at least one function of the first external electronic device, the processor 360 may display, through the display module 330, an object (e.g., an object 1422 indicating a volume control key of the TV remote control or an object 1424 indicating a channel switching key of the TV remote control) corresponding to at least one function of the first external electronic device on at least one key of the first remote control device.

In an embodiment, in FIG. 14C, in the case where the first remote control device is an air conditioner remote control 1430 (e.g., an air conditioner remote control using IR communication), a virtual image 1430-1 including a plurality of keys of a TV remote control, which are mapped to a plurality of keys of the air conditioner remote control 1430, may be displayed on the air conditioner remote control 1430 by the second mapping method. In an embodiment, in FIG. 14C, if remapping is performed between at least one key of the air conditioner remote control 1430 and the TV remote control, the processor 360 may display, through the display module 330, an object corresponding to at least one function of the TV remote control (e.g., an object 1432 indicating a volume control key of the TV remote control 1432 or an object 1434 indicating a channel switching key of the TV remote control 1434) on at least one key of the air conditioner remote control 1430 (e.g., a temperature control key 1431 of the air conditioner remote control 1430 or a wind speed control key 1433 of the air conditioner remote control 1420).

Figure 15:
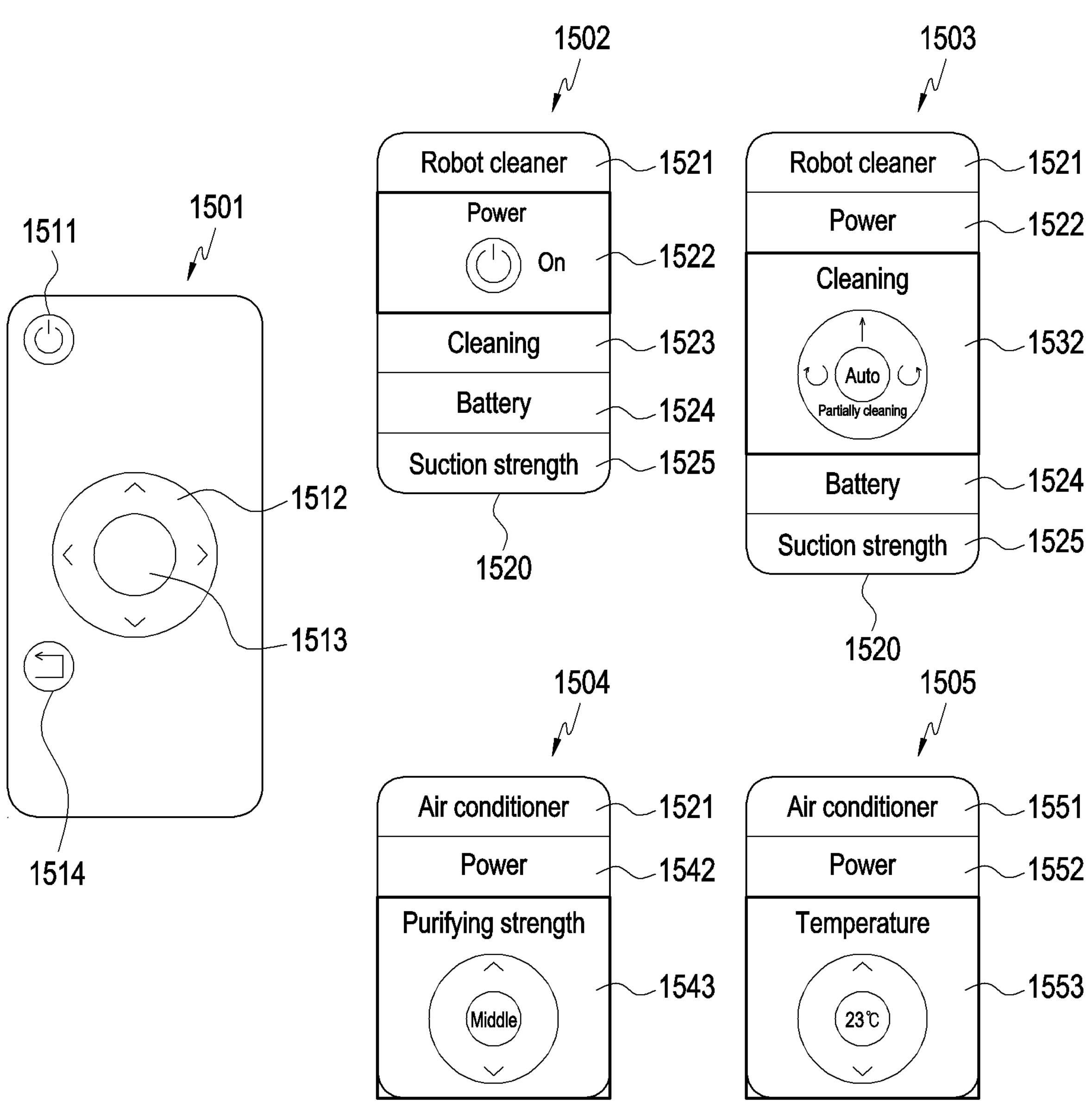
FIG. 15 is a diagram illustrating an example method for mapping at least one key of a first remote control device and at least one function of a first external electronic device using a third mapping method according to various embodiments.

FIG. 15 is a diagram illustrating an example method of mapping at least one key of a first remote control device and at least one function of a first external electronic device using a third mapping method according to various embodiments.

Referring to FIG. 15, the third mapping method may include a mapping method capable of controlling at least one function of the first external electronic device, if the first remote control device is a designated remote control, using at least one key of the designated remote control.

In an embodiment, the designated remote control may be a remote control capable of NUI (natural user interface) processing (hereinafter referred to as a "designated remote control" or a "simple remote control"). In an embodiment, the designated remote control may be an integrated smart remote control capable of communicating to a server and controlling a plurality of external electronic devices that are in communication connected with the designated remote control, instead of being dedicated to a specific external electronic device.

In an embodiment, the designated remote control may include a remote control that includes, as indicated by reference numeral 1501 in FIG. 15, only a minimum number of keys for selecting and executing a function of the external electronic device, such as a power key 1511, a movement key 1512 (e.g., a key for moving a selection), a confirm key 1513, and a cancel key 1514. However, the keys included in the designated remote control are not limited to the examples described above, and the designated remote control may further include additional keys not described above.

In an embodiment, reference numerals 1502 and 1503 may represent examples illustrating operations of selecting a function of the first external electronic device in order to control the first external electronic device through the designated remote control. In reference numerals 1502 and 1503, in the case where the first external electronic device is a robot cleaner and where the type of the first remote control device is a designated remote control, a virtual image 1520 for controlling a function of the robot cleaner may be displayed through the display module 330. In reference numeral 1502, the image 1520 may include information 1521 indicating that the first external electronic device is a robot cleaner, an object 1522 for turning on/off the robot cleaner, an object 1523 for controlling a cleaning function of the robot cleaner, an object 1524 for controlling a function of a battery of the robot cleaner, and an object 1525 for controlling the suction strength of the robot cleaner. Reference numeral 1502 shows that the object 1522 for turning on/off the robot cleaner is selected (or activated). For example, in order to indicate that the object 1522 for turning on/off the robot cleaner is selected, the object 1522 for turning on/off the robot cleaner may be highlighted. If a user input to the confirm key 1513 of the designated remote control is received in the state in which the object 1522 for turning on/off the robot cleaner is selected, the processor 360 may control the robot cleaner so as to turn on or off the robot cleaner. In an embodiment, if a user input to the movement key 1512 of the designated remote control is received in the state in which the object 1522 for turning on/off the robot cleaner is selected, the processor 360 may move the selection from the object 1522 for turning on/off the robot cleaner to the object 1523 for controlling the cleaning function of the robot cleaner. If the selection is moved to the object 1523 for controlling the cleaning function of the robot cleaner, as indicated by reference numeral 1503, the processor 360 may select an object 1532 indicating details of the cleaning function of the object 1523 for controlling the cleaning function of the robot cleaner. For example, if the selection is moved to the object 1523 for controlling the cleaning function of the robot cleaner, the highlight may be moved from the object 1522 for turning on/off the robot cleaner to the object 1532 indicating details of the cleaning function.

In an embodiment, the objects included in a virtual image for controlling the function of the first external electronic device, such as the virtual image 1520 for controlling the function of the robot cleaner, may vary depending on the type of the first external electronic device. For example, in the case where the first external electronic device is an air purifier, a virtual image 1540, as indicated by reference numeral 1504, may include information 1541 indicating that the first external electronic device is an air purifier, an object 1542 for turning on/off the air purifier, and an object 1543 for a function of controlling the purifying intensity of the air purifier. For example, in the case where the first external electronic device is an air conditioner, a virtual image 1550, as indicated by reference numeral 1505, may include information 1551 indicating that the first external electronic device is an air conditioner, an object 1552 for turning on/off the air conditioner, and an object 1553 for a function of controlling the temperature of the air conditioner.

Referring back to FIG. 4, in operation 411, in an embodiment, the processor 360 may control the first external electronic device to perform at least one function using the first remote control device.

In an embodiment, if at least one function of the first external electronic device is mapped to at least one key of the first remote control device (or if at least one key of the remote control device corresponding to the first external electronic device is remapped to at least one key of the first remote control device), the processor 360 may receive, through the communication module 310, based on a user input to at least one key of the first remote control device, a command corresponding to at least one key of the first remote control device in which the user input is received. The processor 360 may transmit the command to the first external electronic device through the communication module 310. If the command is received by the first external electronic device, the first external electronic device may perform a function of the first external electronic device corresponding to the command.

Figure 16:
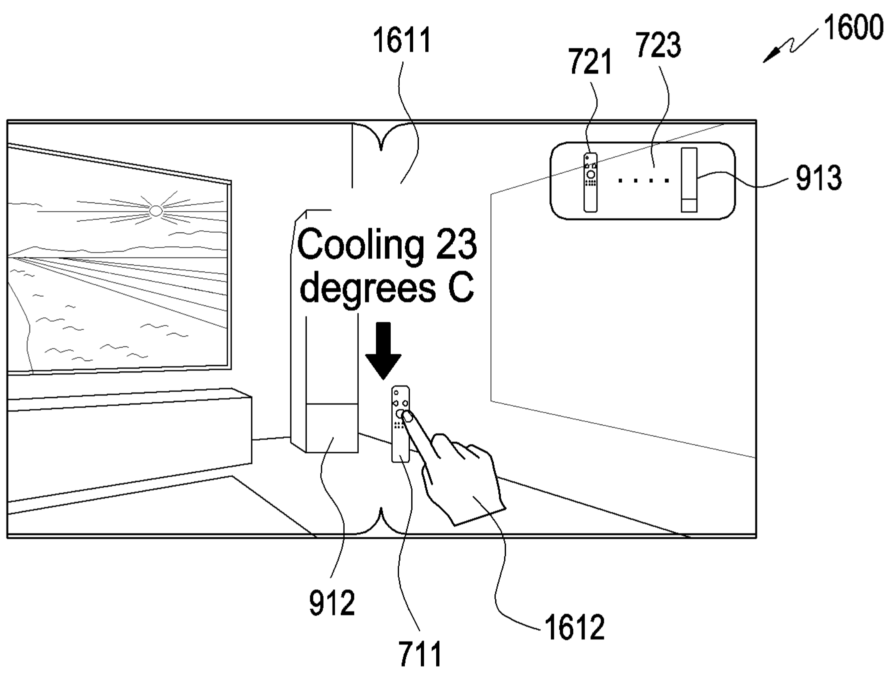
FIG. 16 is a diagram illustrating an example method for controlling a first external electronic device to perform at least one function using a first remote control device according to various embodiments.

FIG. 16 is a diagram 1600 illustrating an example method for controlling a first external electronic device to perform at least one function using a first remote control device according to various embodiments.

Referring to FIG. 16, in an embodiment, after at least one function of the first external electronic device 912 is mapped to at least one key of the first remote control device 711, a user input may be input using the user's finger 1612 to the first remote control device 711. The processor 360 may receive, through the communication module 310, a command corresponding to the key of the first remote control device 711 into which the user input is input from the first remote control device 711 (or from the first remote control device 711 via the external electronic device corresponding to the first remote control device 711 and a server). If the command is received, the processor 360 may control the first external electronic device to perform a function of the first external electronic device corresponding to the command. For example, if the command is to control the cooling temperature of the first external electronic device (e.g., an air conditioner), the processor 360 may control the first external electronic device so that the first external electronic device controls the cooling temperature. In an embodiment, the processor 360 may display, through the display module 330, information indicating a function of the first external electronic device corresponding to the key of the first remote control device into which the user input is input. For example, as shown in FIG. 16, the processor 360 may display, through the display module 330, information 1611 indicating a function of the first external electronic device 912 corresponding to the key of the first remote control device 711 into which the user input is input so as to overlap the position where the first external electronic device 912 is displayed. However, the disclosure is not limited thereto, and the processor 360 may output, through the speaker, audio indicating that a function of the first external electronic device 912 corresponding to the key of the first remote control device 711 into which the user input is input is performed (or the user input is input to the key of the first remote control device 711).

Referring back to FIG. 4, in an embodiment, if at least one function of the first external electronic device is mapped to at least one key of the first remote control device, the processor 360 may display, through the display module 330, an object indicating at least one function of the first external electronic device mapped to at least one key of the first remote control device so as to overlap at least one key of the first remote control device.

In an embodiment, if at least one key of the remote control device corresponding to the first external electronic device is remapped to at least one key of the first remote control device, the processor 360 may display, through the display module 330, an object indicating the at least one remapped key of the remote control device corresponding to the first external electronic device so as to overlap at least one key of the first remote control device.

In an embodiment, in the case where the first remote control device is a designated remote control (e.g., a simple remote control), the processor 360 may display, through the display module 330, an image (e.g., the image 1520, the image 1540, or the image 1550 in FIG. 15) including objects for controlling the first external electronic device at the position of the first external electronic device or the position of the first remote control device (or at a position spaced a specified distance apart from the position of the first external electronic device or the position of the first remote control device).

Figure 17:
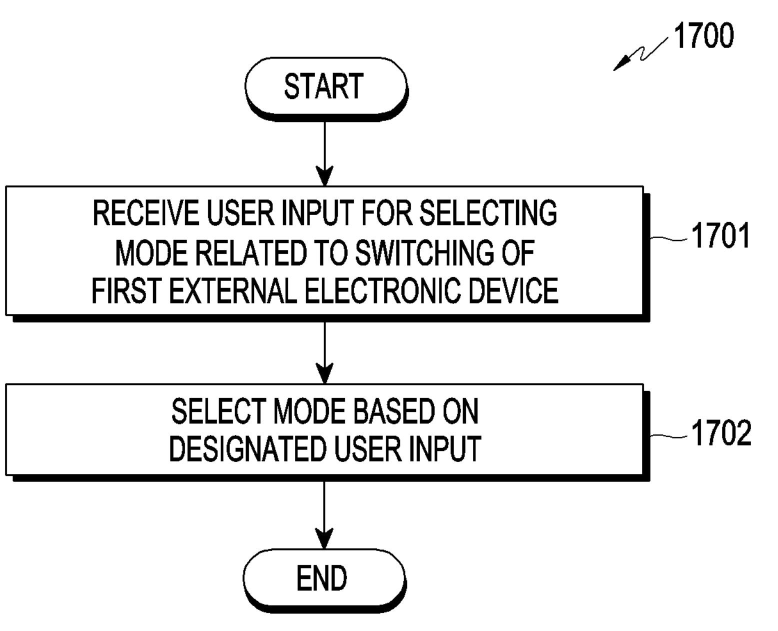
FIG. 17 is a flowchart illustrating an example mode related to switching of a first external electronic device according to various embodiments.

FIG. 17 is a flowchart 1700 illustrating an example mode related to switching of a first external electronic device according to various embodiments.

Figure 18:
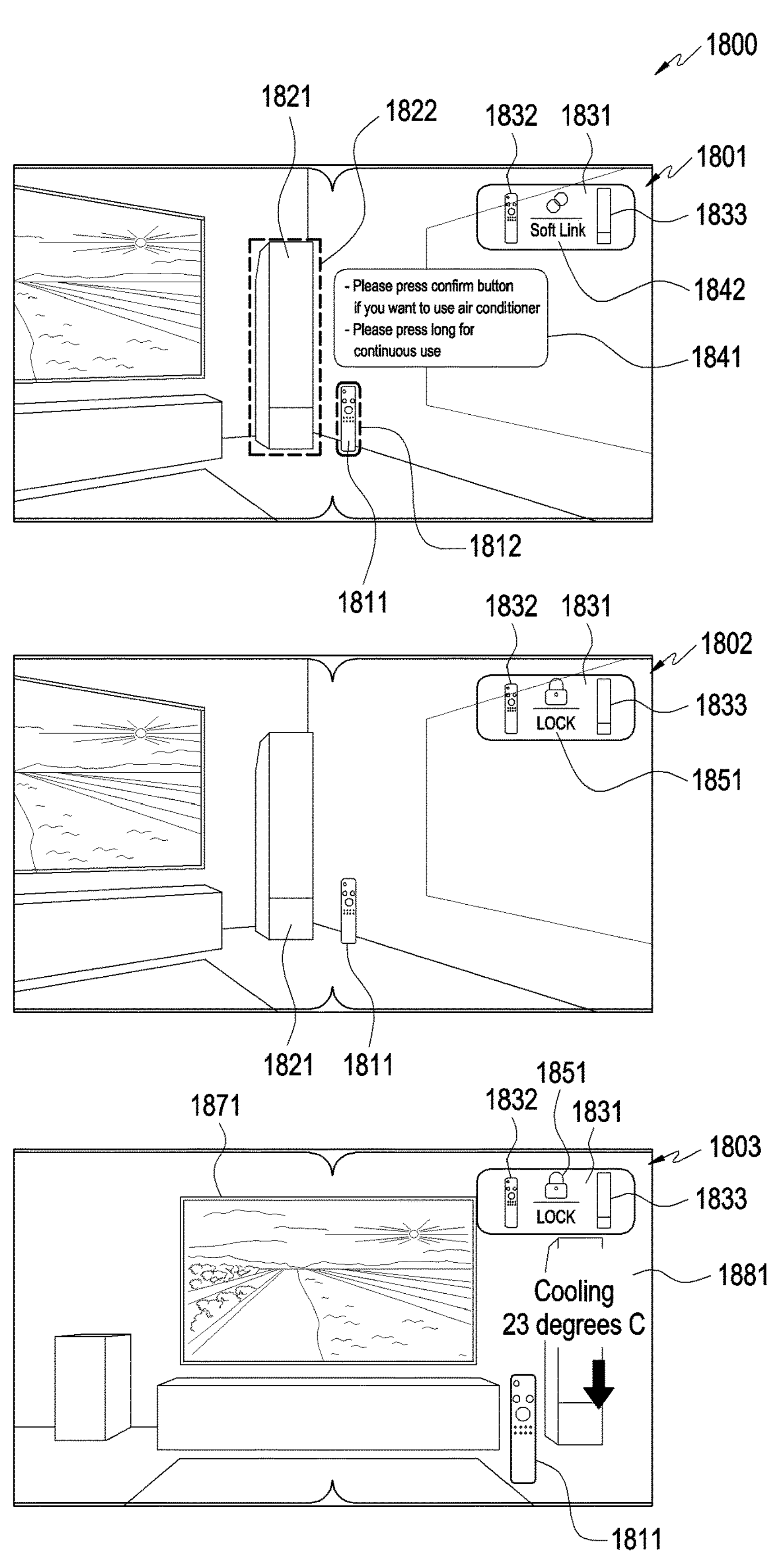
FIG. 18 is a diagram illustrating an example mode related to switching of a first external electronic device according to various embodiments.

FIG. 18 is a diagram 1800 illustrating an example mode related to switching of a first external electronic device according to various embodiments.

Referring to FIG. 17 and FIG. 18, in operation 1701, in an embodiment, in the state where a connection with the first remote control device is established and where the first external electronic device is detected (or where a communication connection with the first external electronic device is established), the processor 360 may receive a user input for selecting a mode related to switching of the first external electronic device.

In an embodiment, the processor 360 may establish a communication connection between the electronic device and the first external electronic device by detecting the first external electronic device that exists in a range corresponding to the user's gaze after the connection with the first remote control device is established. For example, the processor 360 may establish a communication connection between the electronic device 301 and external electronic device 1 by detecting external electronic device 1 existing within a first range corresponding to the user's gaze after a connection with the first remote control device is established. If the range corresponding to the user's gaze is changed from the first range to a second range, the processor 360 may establish a communication connection between the electronic device 301 and external electronic device 2 by detecting external electronic device 2 existing within the second range. Hereinafter, a mode for changing the communication connection with the first external electronic device existing within the range corresponding to the user's gaze depending on a change in the range corresponding to the user's gaze will be referred to as a "first mode (or a first mode of the electronic device)" or a "soft link".

In an embodiment, the processor 360 may maintain the communication connection between the electronic device 301 and the first external electronic device even if it is detected that another external electronic device, other than the first external electronic device, exists within the range corresponding to the user's current gaze due to a change in the user's gaze after the connection with the first remote control device is established. Hereinafter, a mode for maintaining a communication connection with the first external electronic device that is connected to the electronic device 301, regardless of a change in the range corresponding to the user's gaze, will be referred to as a "second mode (or a second mode of the electronic device)", a "hard link", or a "hard lock".

In an embodiment, the mode related to switching of the first external electronic device may include a first mode and a second mode.

In an embodiment, if a designated user input (e.g., a long-press input) for selecting a mode (e.g., the first mode or the second mode) related to switching of the first external electronic device is received in the first remote control device, the processor 360 may receive the designated user input from the first remote control device through the communication module 310. However, the disclosure is not limited thereto, and the processor 360 may receive a designated user input for selecting a mode related to switching of the first external electronic device through an input device (e.g., a microphone or a touch pad) of the electronic device 301.

In operation 1702, in an embodiment, the processor 360 may select a mode, based on the user input. For example, the processor 360 may select the first mode or the second mode.

Hereinafter, the mode related to switching of the first external electronic device will be described in greater detail with reference to FIG. 18.

In an embodiment, in reference numeral 1801, if a first remote control device 1811 and a first external electronic device 1821 are detected, the processor 360 may display indications 1812 and 1822 indicating that the first remote control device 1811 and the first external electronic device 1821 are detected through the display module 330. In an embodiment, if a communication connection with the first remote control device 1811 and the first external electronic device 1821 is established, the processor 360 may display images 1832 and 1833 indicating that the communication connection with the first remote control device 1811 and the first external electronic device 1821 is established on a designated area 1831 of the transparent member through the display module 330.

In an embodiment, in reference numeral 1801, if the electronic device is operating in the first mode (soft link), the processor 360 may display information 1842 indicating that the electronic device 301 is operating in the first mode (soft link) through the display. In an embodiment, in reference numeral 1801, the processor 360 may display, through the display module 330, information 1841 guiding a user input for switching the mode of the electronic device 301 from the first mode to the second mode.

In an embodiment, if a user input for switching the mode of the electronic device 301 from the first mode to the second mode is received from the first remote control device 1811 (e.g., if information indicating that a user input for switching the mode of the electronic device 301 from the first mode to the second mode is received from the first remote control device 1811), the processor 360 may switch the mode of the electronic device 301 from the first mode to the second mode. In an embodiment, if the mode of the electronic device 301 is switched from the first mode to the second mode, as indicated by reference numeral 1802, the processor 360 may display, through the display module 330, information 1851 indicating the second mode (e.g., information indicating that the electronic device 301 is operating in the second mode) within a designated area 1831.

In an embodiment, the processor 360 may maintain the communication connection between the electronic device 301 and the first external electronic device even if it is detected that the first external electronic device and another external electronic device 1871 exist within a range corresponding to the user's current gaze due to a change in the user's gaze in the second mode. For example, as indicated by reference numeral 1803, even if the first external electronic device 1821 and another external electronic device exist within a range corresponding to the user's gaze due to a change in the range corresponding to the user's gaze, the communication connection between the electronic device 301 and the first external electronic device 1821 may remain. The processor 360 may control the first external electronic device 1821 using the first remote control device 1811 even if the first external electronic device 1821 is not present within a range corresponding to the user's gaze in the second mode. For example, even if the first external electronic device 1821 does not exist within the range corresponding to the user's gaze, a command for controlling the cooling temperature may be transmitted to the first external electronic device 1821 (e.g., an air conditioner) using the first remote control device 1811. The processor 360 may display, through the display module 330, information 1881 indicating that a user input corresponding to the command for controlling the cooling temperature to the first external electronic device 1821 (e.g., an air conditioner) is input to the first remote control device 1811.

Figure 19:
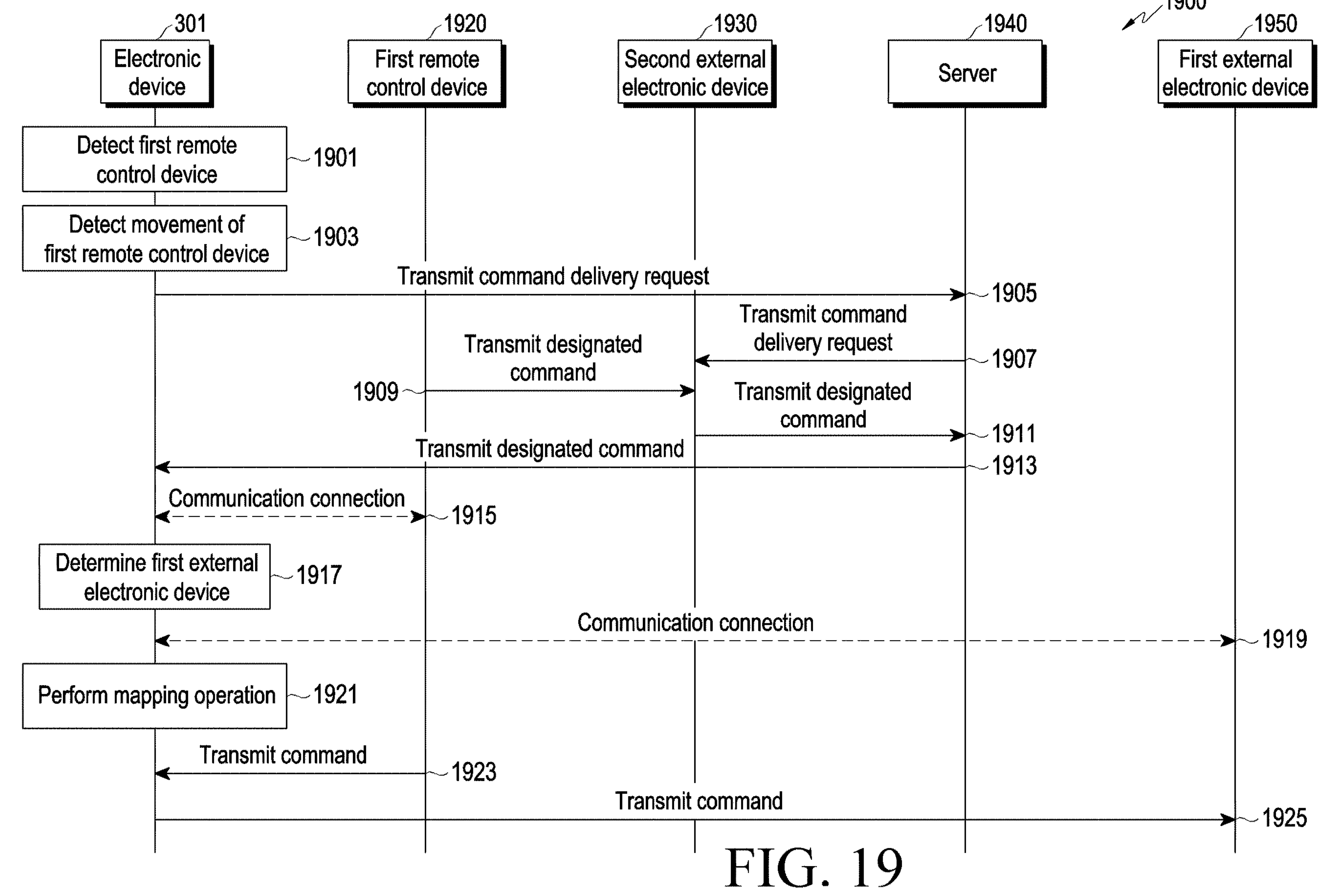
FIG. 19 is a signal flow diagram illustrating an example method for controlling an external electronic device using a remote control device according to various embodiments.

FIG. 19 is a signal flow diagram 1900 illustrating an example method of controlling an external electronic device using a remote control device according to various embodiments.

Referring to FIG. 19, in an embodiment, an electronic device 301, a first external electronic device 1950, and a second external electronic device 1930 may be registered with a server 1940 providing an IoT service.

In operation 1901, in an embodiment, the electronic device 301 may detect a first remote control device 1920.

In operation 1903, in an embodiment, the electronic device 301 may detect the movement of the first remote control device 1920 after the first remote control device 1920 is detected.

In operation 1905, in an embodiment, if the movement of the first remote control device 1920 is detected, the electronic device 301 may transmit a command delivery request to the server 1940.

In operation 1907, in an embodiment, the server 1940 may transmit the command delivery request to the second external electronic device 1930 corresponding to the first remote control device 1920.

In operation 1909, in an embodiment, the first remote control device 1920 may transmit a designated command for communication connection with the electronic device 301 to the second external electronic device 1930.

In operation 1911, in an embodiment, the second external electronic device 1930 may transmit the designated command to the server 1940.

In operation 1913, in an embodiment, the server 1940 may transmit the designated command to the electronic device 301.

In operation 1915, in an embodiment, the electronic device 301 may establish a communication connection with the first remote control device 1920 in response to receiving the designated command.

In operation 1917, in an embodiment, the electronic device 301 may determine the first external electronic device 1950 in which a function is to be performed using the first remote control device 1920.

In operation 1919, in an embodiment, the electronic device 301 may establish a communication connection with the first external electronic device 1950.

In operation 1921, in an embodiment, the electronic device 301 may perform a mapping operation for controlling the first external electronic device 1950 using the first remote control device 1920.

In operation 1923, in an embodiment, the first remote control device 1920 may transmit a command corresponding to a user input.

In operation 1925, in an embodiment, the electronic device 301, based on the command from the first remote control device 1920, may transmit a command to the second external electronic device 1930 so that the second external electronic device 1930 performs a function corresponding to the command.

Although the above-described FIGS. 4 to 19 illustrate that the first external electronic device 1950 is controlled using the first remote control device 1920 by establishing a communication connection with the first external electronic device 1950 after establishing a communication connection with the first remote control device 1920, the disclosure is not limited thereto. Hereinafter, an example of controlling the first external electronic device 1950 using the first remote control device 1920 by establishing a communication connection with the first remote control device 1920 after establishing a communication connection with the first external electronic device 1950 will be described with reference to FIGS. 20 and 21.

Figure 20:
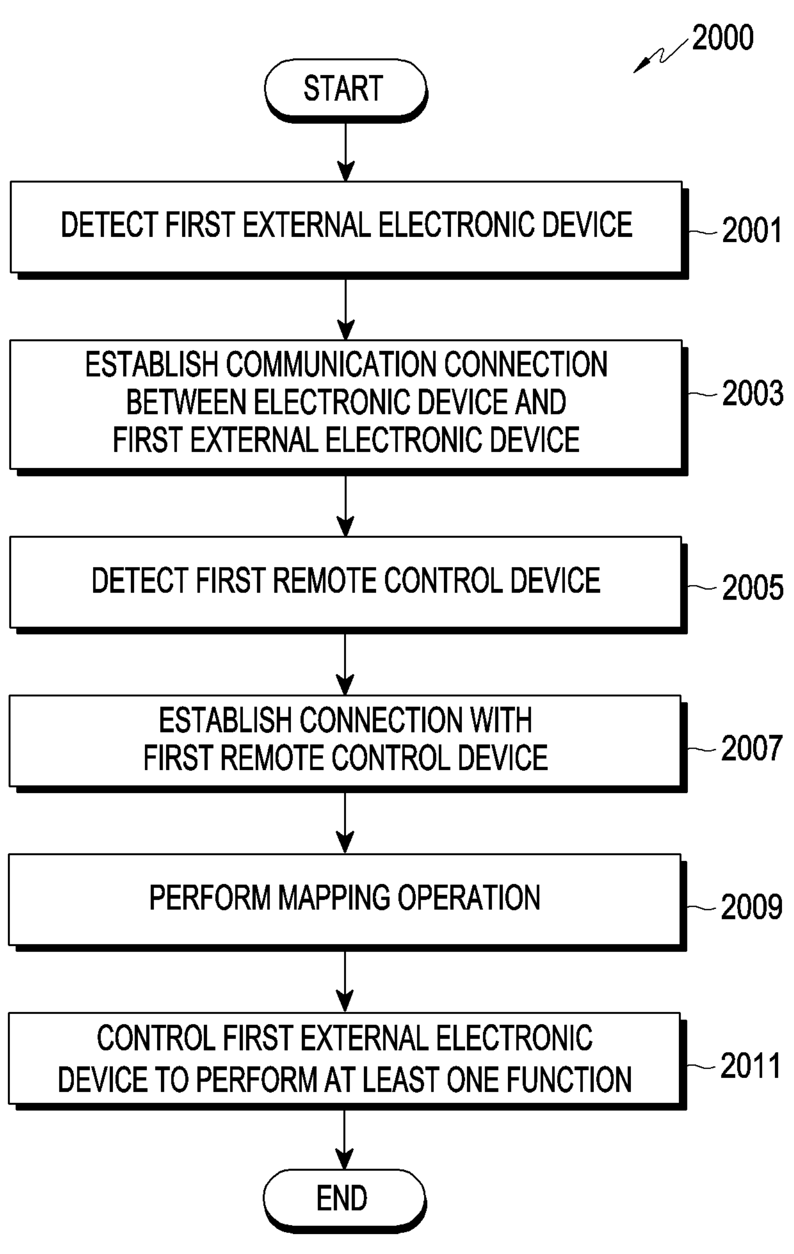
FIG. 20 is a flowchart illustrating an example method for controlling an external electronic device using a remote control device according to various embodiments.

FIG. 20 is a flowchart 2000 illustrating an example method of controlling an external electronic device using a remote control device according to various embodiments.

Figure 21:
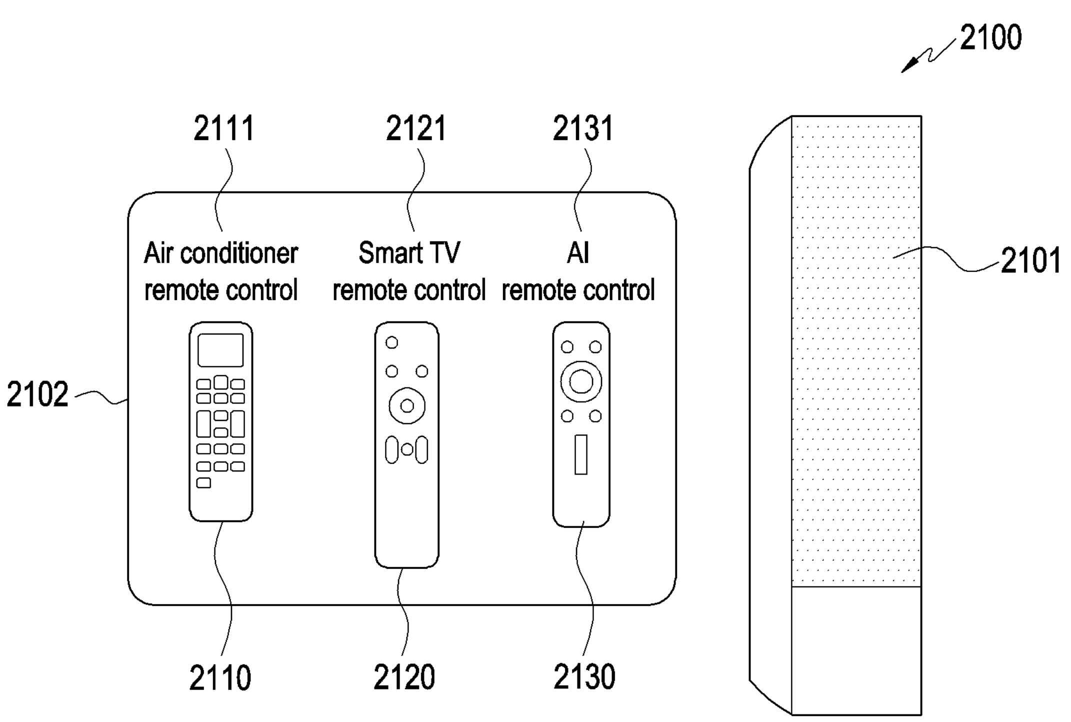
FIG. 21 is a diagram illustrating an example method for controlling an external electronic device using a remote control device according to various embodiments.

FIG. 21 is a diagram 2100 illustrating an example method of controlling an external electronic device using a remote control device according to various embodiments.

Referring to FIGS. 20 and 21, in operation 2001, in an embodiment, the processor 360 may detect a first external electronic device through the communication module 310.

In an embodiment, the processor 360 may detect the gaze of a user wearing the electronic device through the camera module 320 (e.g., one or more second cameras 212-1 and 212-2 in FIG. 2). The processor 360 may obtain an image of a first external electronic device located within a range (e.g., a view) corresponding to the user's gaze through the camera module 320 (e.g., one or more first cameras 211-1 and 211-2 in FIG. 2). The processor 360 may detect the first external electronic device by comparing the obtained image with a plurality of images stored in the memory 350 and including external electronic devices.

In an embodiment, the processor 360 may obtain an image of a first external electronic device located within a range of field of view of the camera module 320 (e.g., a designated area from the center of the field of view of the camera module 320) through the camera module 320 (e.g., one or more first cameras 211-1 and 211-2 in FIG. 2). The processor 360 may compare the obtained image with a plurality of images stored in the memory 350 and including external electronic devices, thereby detecting the first external electronic device.

Although the above examples show that the processor 360 detects the first external electronic device, based on the image obtained through the camera module 320, the disclosure is not limited thereto. For example, the processor 360 may detect the first external electronic device located in the direction in which the electronic device is facing through the communication module 310 (e.g., ultra-wideband (UWB) communication module 310).

In an embodiment, if the first external electronic device is detected, the processor 360 may output information indicating that the first external electronic device is detected.

In an embodiment, if the first external electronic device is detected, the processor 360 may request information about the first external electronic device from the server through the communication module 310. The processor 360 may transmit the request and then receive information about the first external electronic device from the server through the communication module 310. Information about the first external electronic device may include the type, name, and model name of the first external electronic device, a function performed by the first external electronic device, an operating state, and/or information for a communication connection with the first external electronic device. However, the information about the first external electronic device is not limited to the above-described example.

In operation 2003, in an embodiment, the processor 360 may control the communication module 310 such that the communication module 310 establishes a communication connection between the electronic device 301 and the first external electronic device. For example, in the state where the first external electronic device is detected, the processor 360, based on a designated user input to the electronic device 301 (or the first remote control device), may establish a communication connection between the electronic device 301 and the first external electronic device through short-range communication module (e.g., a Bluetooth module or a Wi-Fi module).

In an embodiment, if the first external electronic device is detected or if a communication connection is established between the electronic device 301 and the first external electronic device, the processor 360 may obtain information about at least one remote control device capable of controlling the first external electronic device. For example, if the first external electronic device is detected or if a communication connection is established between the electronic device 301 and the first external electronic device, the processor 360 may request, through the communication module 310, information about at least one remote control device capable of controlling the first external electronic device from the server. After transmitting the request, the processor 360 may receive information about at least one remote control device capable of controlling the first external electronic device from the server through the communication module 310. The information about at least one remote control device received from the server may be a list of protocols, manufacturer codes, and data codes of at least one remote control device. The date code is a command code for recognizing an IR command if the remote control device uses IR communication, and may be an IR signal value corresponding to each of at least one key of the remote control device.

In an embodiment, if the information about at least one remote control device capable of controlling the first external electronic device is received, the processor 360 may display the received information through the display module 330. For example, in FIG. 21, the processor 360 may display, through the display module 330, information 2102 about at least one remote control device capable of controlling the first external electronic device at a position (or at least partially overlapping the same) adjacent to an area on the transparent member where the first external electronic device 2101 is visible. The information 2102 may include an image 2110 and information 2111 of remote control device 1, an image 2120 and information 2121 of remote control device 2, and an image 2130 and information 2131 of remote control device 3. However, the information 2102 for at least one remote control device capable of controlling the first external electronic device is not limited to the above-described example.

Referring back to FIG. 20, in operation 2005, in an embodiment, the processor 360 may detect a first remote control device.

Since operation 2005 is at least partially identical or similar to operation 401 in FIG. 4, the redundant description thereof may not be repeated.

In an embodiment, the processor 360 may perform an operation of detecting a first remote control device if the first external electronic device is detected or if a user input is received after a communication connection is established between the electronic device and the first external electronic device.

In operation 2007, in an embodiment, the processor 360 may establish a connection with the first remote control device.

Since operation 2007 is at least partially identical or similar to operation 403 in FIG. 4, a redundant description thereof may not be repeated.

In operation 2009, in an embodiment, the processor 360 may perform an operation of mapping at least one key of the first remote control device and at least one function of the first external electronic device.

Since operation 2009 is at least partially identical or similar to operation 409 in FIG. 4, a redundant description thereof may not be repeated.

In operation 2011, in an embodiment, the processor 360 may control the first external electronic device to perform at least one function using the first remote control device.

Since operation 2011 is at least partially identical or similar to operation 411 in FIG. 4, a redundant description thereof may not be repeated.

Although FIG. 20 and FIG. 21 illustrate that the operation for controlling a remote control device is performed based on a user input to a screen displayed through a display 330, the disclosure is not limited thereto. For example, the processor 360 may output a voice related to a screen displayed on the display 330 through the speaker 343 and receive a user's voice through the microphone 342, thereby performing the operation for controlling a remote control device.

Figure 22:
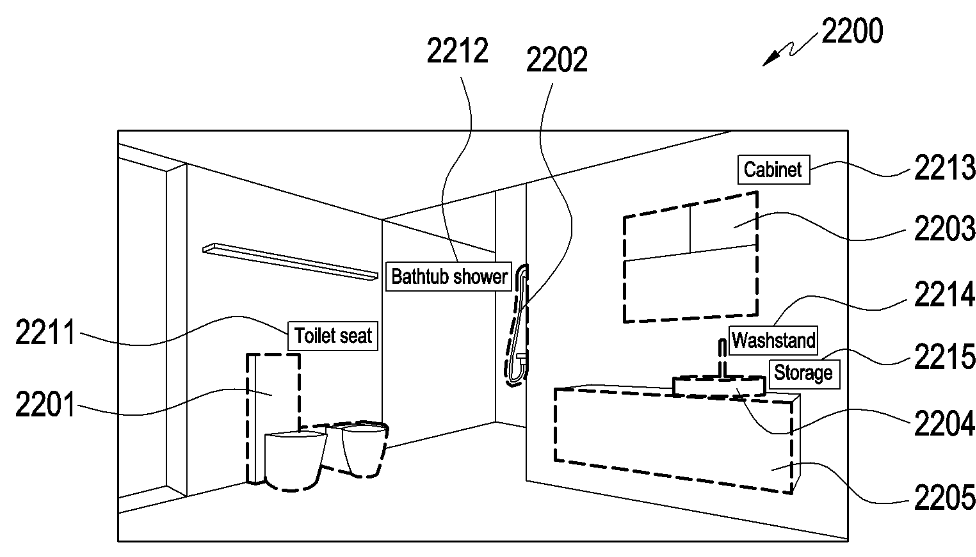
FIG. 22 is a diagram illustrating an example method for controlling an external electronic device using a remote control device according to various embodiments.

FIG. 22 is a diagram 2200 illustrating an example method of controlling an external electronic device using a remote control device according to various embodiments.

Referring to FIG. 22, in an embodiment, the processor 360 may cause the electronic device 301 to enter a mode (home control mode) for controlling an external electronic device, based on a user input, while the electronic device 301 is worn by a user.

In an embodiment, if the electronic device 301 enters the mode for controlling an external electronic device, the processor 360 may detect at least one external electronic device disposed within a range corresponding to the user's gaze. For example, in FIG. 22, in the case where a bathroom is registered as a designated place (e.g., a room) in the server, the processor 360 may detect at least one external electronic device (e.g., a toilet seat 2201, a bathtub shower 2202, a cabinet 2203, a washstand 2204, or a storage 2205) disposed within a range corresponding to the user's gaze inside the bathroom. If at least one external electronic device is detected, the processor 360 may display, through the display module 330, an indication (or highlighted sign) indicating that at least one external electronic device is detected and information 2211, 2212, 2213, 2214, and 2215 about at least one external electronic device. The processor 360 may output, through the speaker, audio indicating that at least one external electronic device is detected if at least one external electronic device is detected.

Figure 23A:
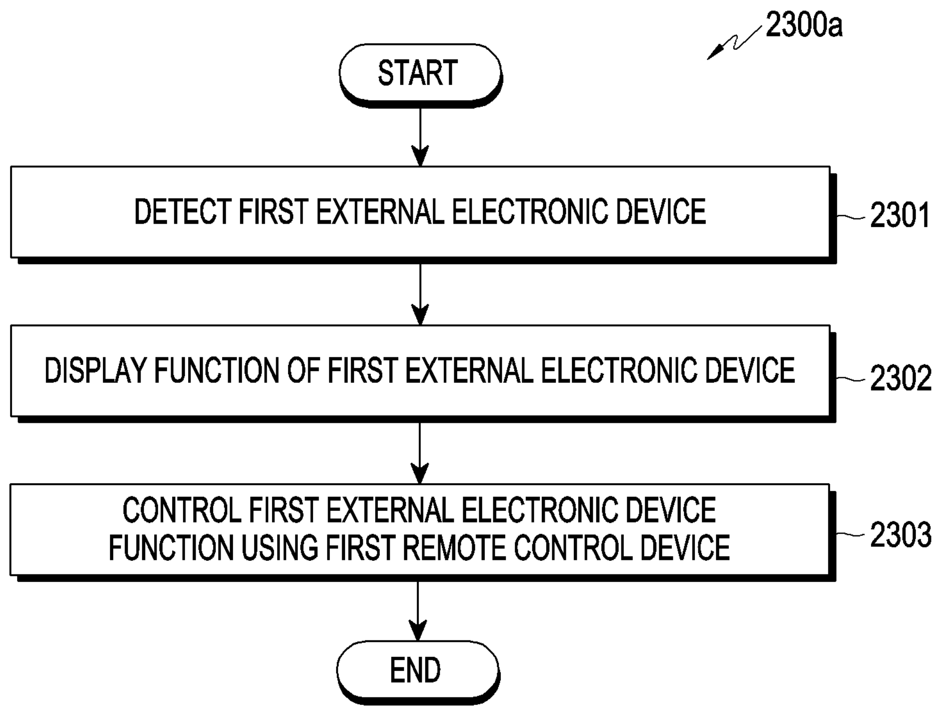
FIG. 23A is a flowchart illustrating an example method for controlling an external electronic device using a remote control device according to various embodiments.

FIG. 23A is a flowchart 2300*a* illustrating an example method of controlling an external electronic device using a remote control device according to various embodiments.

Figure 23B:
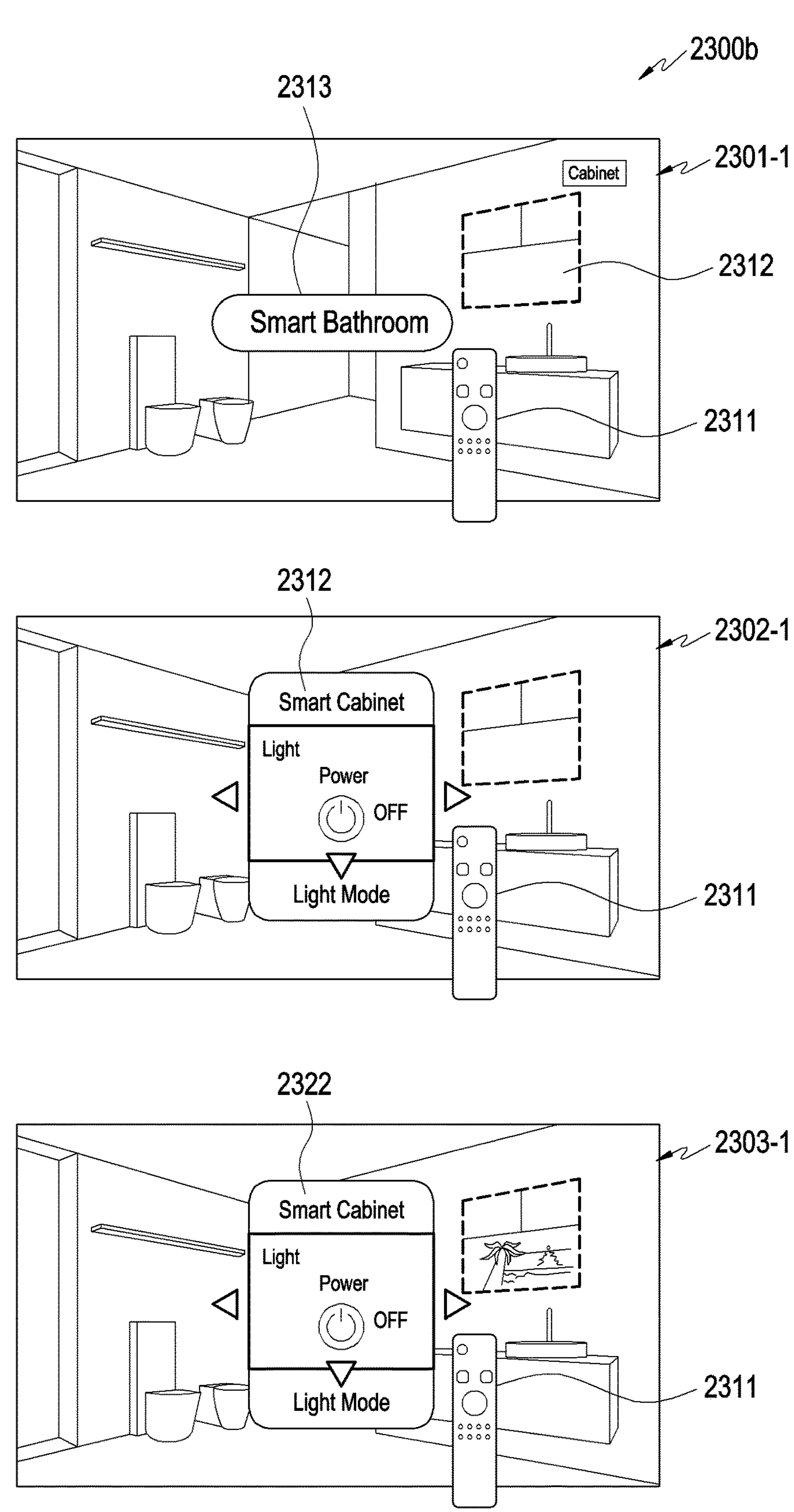
FIG. 23B is a diagram illustrating an example method for controlling an external electronic device using a remote control device according to various embodiments.

FIG. 23B is a diagram 2300*b* illustrating an example method of controlling an external electronic device using a remote control device according to various embodiments.

Referring to FIGS. 23A and 23B, in operation 2301, in an embodiment, the processor 360 may detect a first external electronic device. For example, in reference numeral 2301-1 in FIG. 12B, a cabinet 2312 existing in a range corresponding to the user's gaze may be detected as a first external electronic device to be controlled using the first remote control device 2311.

In an embodiment, if the cabinet 2312 is detected, the processor 360 may output an indication and audio indicating that the cabinet 2312 is detected, and information 2313 indicating that the designated position is a bathroom.

In operation 2302, in an embodiment, the processor 360 may display a function of the first external electronic device.

In an embodiment, if the type of the first remote control device 2311 is a simple remote control, the processor 360 may display, through the display module 330, a virtual image 2321 or 2322 for controlling the function of the cabinet 2312 to be displayed adjacent to the first remote control device 2311 or the cabinet 2312. The virtual images 2321 or 2322 may include a plurality of objects indicating a plurality of functions (e.g., light functions (functions of controlling the type and intensity of light), screen functions (functions related to the screen of the cabinet 2312), and digital appliance (DA) functions) of the cabinet 2312.

In operation 2303, in an embodiment, the processor 360 may control a function of the first external electronic device using the first remote control device.

In an embodiment, the processor 360 may control a function of the cabinet 2312 using the first remote control device 2311 while the virtual image 2321 or 2322 is displayed. For example, the processor 360 may move a highlight for selecting an object indicating a function of the cabinet 2312 included in the virtual image 2321 or 2322 or select the object using the first remote control device 2311, as indicated by reference numerals 2302-1 and 2303-1. For example, the processor 360 may select (and execute) a light function of the cabinet 2312, as indicated by reference numerals 2302-1. For example, the processor 360 may select (and execute) a power-on/off function of the cabinet 2312, as indicated by reference numerals 2302-1.

A method for controlling an external electronic device using a remote control device in an electronic device according to an example embodiment may include: detecting a first remote control device; establishing a communication connection with the first remote control device through a communication module of the electronic device; determining a first external electronic device to be controlled using the first remote control device; establishing a communication connection between the electronic device and the first external electronic device through the communication module; mapping at least one key of the first remote control device and at least one function of the first external electronic device; and controlling the first external electronic device to perform the at least one function using the first remote control device.

In an example embodiment, the detecting of the first remote control device may include: obtaining an image through a camera module of the electronic device 01 and detecting the first remote control device existing in a range corresponding to a gaze of a user wearing the electronic device 301, based on the image.

In an example embodiment, the establishing of the communication connection with the first remote control device may include: detecting movement of the first remote control device, based on detecting the movement of the first remote control device, requesting a second external electronic device corresponding to the first remote control device to forward a command of the first remote control device to the electronic device, and establishing a communication connection with the first remote control device.

In an example embodiment, the establishing of the communication connection with the first remote control device may include: receiving, via the second external electronic device and a server from the first remote control device through the communication module, an input to the first remote control device, the input being for a communication connection with the first remote control device, and establishing a communication connection with the first remote control device, based on the input.

In an example embodiment, the determining of the first external electronic device may include: detecting the first external electronic device and establishing a communication connection between the first external electronic device and the electronic device.

In an example embodiment, the determining of the first external electronic device may include: outputting a list of external electronic devices which are controllable using the first remote control device, based on the communication connection with the first remote control device being established, determining the first external electronic device from among the external electronic devices, based on an input to the list, and establishing a communication connection between the first external electronic device and the electronic device.

In an example embodiment, the performing an operation of mapping may include displaying, through the display module of the electronic device, at least one object corresponding to at least one function of the first external electronic device so that the at least one object is by a user wearing the electronic device, viewable to be disposed in a three-dimensional space around the electronic device, selecting an object corresponding to the user's gaze from among the at least one object, receiving, from the first remote control device through the communication module, information about a key of the first remote control device, an input to the key, a function corresponding to the object being to be mapped to the key, and mapping a function corresponding to the selected object to the key of the first remote control device.

In an example embodiment, the displaying of the at least one object through the display module of the electronic device may include: classifying at least one function of the first external electronic device into groups having priorities, based on the user's use history for each of the at least one function, and displaying the at least one object, based on the priorities of the groups, through the display module so that the at least one object is, by the user, viewable to be disposed in a three-dimensional space around the electronic device.

In an example embodiment, the controlling the first external electronic device to perform the at least one function using the first remote control device may include: displaying, based on the at least one function of the first external electronic device being mapped to at least one key of the first remote control device, an object to overlap the at least one key of the first remote control device through the display module of the electronic device, the objecting indicating the at least one mapped function.

In addition, the structure of data used in the various embodiments of the disclosure described above may be recorded on a non-transitory computer-readable recording medium through various means. The computer-readable recording medium includes a storage medium such as a magnetic storage medium (e.g., ROM, floppy disk, hard disk, etc.), an optical reading medium (e.g., CD-ROM, DVD, etc.), or the like.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

communication circuitry;

at least one processor including processing circuitry; and memory storing instructions that, when executed by the at least one processor individually or collectively, cause the electronic device to:

detect a remote control device;

establish a communication connection with the remote control device through the communication circuitry;

based on the communication connection with the remote control device being established, determine a first external electronic device to be controlled using the remote control device;

control the communication circuitry to establish a communication connection between the electronic device and the first external electronic device;

based on establishing the communication connection between the electronic device and the first external electronic device, map at least one key of the remote control device and at least one function of the first external electronic device;

after mapping the at least one key of the remote control device and the at least one function of the first external electronic device, receive, through the communication circuitry from the remote control device, information on a first key on which a first user input is received among the at least one key of the remote control device; and transmit, through the communication circuitry to the first external electronic device, a signal causing the first external electronic device to perform a function mapped to the first key among the at least one function.

2. The electronic device of claim 1, further comprising a camera, wherein the instructions, when executed by the at least one processor individually or collectively, further cause the electronic device to:

obtain an image through the camera, wherein based on the image the remote control device being in a range corresponding to a gaze of a user wearing the electronic device is detected.

3. The electronic device of claim 1, wherein the instructions, when executed by the at least one processor individually or collectively, further cause the electronic device to:

detect movement of the remote control device;

based on detecting the movement of the remote control device, request, through the communication circuitry via a server, a second external electronic device to forward a command received from of the remote control device to the electronic device, wherein the remote control device is dedicated to the second external electronic device; and receive, through the communication circuitry via the second external electronic device and the server, from the remote control device, a command corresponding to a second user input received on the remote control device, the second user input being for the communication connection with the remote control device, wherein based on the receiving the second user input, the communication connection with the remote control device is established.

4. The electronic device of claim 1, wherein based on detecting the first external electronic device, the first external electronic device is determined to be controlled using the remote control device.

5. The electronic device of claim 1, wherein the instructions, when executed by the at least one processor individually or collectively, further cause the electronic device to:

output a list of external electronic devices which are controllable using the remote control device, based on the communication connection with the remote control device being established wherein the first external electronic device is determined to be controlled using the remote control device from among the external electronic devices, based on a user input to the list.

6. The electronic device of claim 1, wherein the instructions, when executed by the at least one processor individually or collectively, further cause the electronic device to:

display, through a display of the electronic device, at least one object corresponding to the at least one function of the first external electronic device so that the at least one object is viewable to be disposed in a three-dimensional space around the electronic device;

select an object corresponding to the user's gaze from among the at least one object; and receive, from the remote control device through the communication circuitry, information about a second key of the remote control device, a user input being inputted to the second key, a function corresponding to the object being to be mapped to the second key, wherein a function corresponding to the selected object is mapped to the second key of the remote control device.

7. The electronic device of claim 6, wherein the instructions, when executed by the at least one processor individually or collectively, cause the electronic device to:

classify the at least one function of the first external electronic device into groups having priorities, based on a user's use history for each of the at least one function; and display the at least one object, based on the priorities of the groups, through the display so that the at least one object is viewable to be disposed in the three-dimensional space around the electronic device.

8. The electronic device of claim 1, wherein the instructions, when executed by the at least one processor individually or collectively, further cause the electronic device to:

based on the at least one function of the first external electronic device being mapped to the at least one key of the remote control device, display, through a display of the electronic device, an object to overlap the at least one key of the remote control device, the objecting indicating the at least one mapped function.

9. A method for controlling an external electronic device using a remote control device in an electronic device, the method comprising:

detecting a remote control device;

establishing a communication connection with the remote control device through communication circuitry of the electronic device;

based on the communication connection with the remote control device being established, determining a first external electronic device to be controlled using the remote control device;

controlling the communication circuitry to establish a communication connection between the electronic device and the first external electronic device;

based on establishing the communication connection between the electronic device and the first external electronic device, mapping at least one key of the remote control device and at least one function of the first external electronic device;

after mapping the at least one key of the remote control device and the at least one function of the first external electronic device, receiving, through the communication circuitry from the remote control device, information on a first key on which a first user input is received among the at least one key of the remote control device; and transmitting, through the communication circuitry to the first external electronic device, a signal causing the first external electronic device to perform a function mapped to the first key among the at least one function.

10. The method of claim 9, wherein the detecting of the remote control device comprises:

obtaining an image through a camera of the electronic device; and detecting the remote control device being in a range corresponding to a gaze of a user wearing the electronic device, based on the image.

11. The method of claim 9, wherein the establishing of the communication connection with the remote control device comprises:

detecting movement of the remote control device;

based on detecting the movement of the remote control device, requesting, through the communication circuitry via a server, to a second external electronic device to forward a command received from the remote control device to the electronic device, wherein the remote control device is dedicated to the second external electronic device;

receiving, through the communication circuitry via the second external electronic device and the server, from the remote control device, a command corresponding to a second user input received on the remote control device, the second user input being for the communication connection with the remote control device; and based on the receiving the second user input, establishing the communication connection with the remote control device.

12. The method of claim 9, wherein the determining of the first external electronic device comprises:

detecting the first external electronic device; and based on detecting the first external electronic device, establishing the communication connection between the first external electronic device and the electronic device.

13. The method of claim 9, wherein the determining of the first external electronic device comprises:

outputting a list of external electronic devices which are controllable using the remote control device, based on the communication connection with the remote control device being established;

determining the first external electronic device from among the external electronic devices, based on a user input to the list; and based on determining the first external electronic device, establishing the communication connection between the first external electronic device and the electronic device.

14. The method of claim 9, wherein the mapping of the at least one key of the remote control device and the at least one function of the first external electronic device comprises:

displaying, through a display of the electronic device, at least one object corresponding to the at least one function of the first external electronic device so that the at least one object is viewable to be disposed in a three-dimensional space around the electronic device;

selecting an object corresponding to the user's gaze from among the at least one object;

receiving, from the remote control device through the communication circuitry, information about a second key of the remote control device, a user input being inputted to the second key, a function corresponding to the object being to be mapped to the second key; and mapping a function corresponding to the selected object to the second key of the remote control device.

15. The method of claim 14, wherein the displaying of the at least one object comprises:

classifying the at least one function of the first external electronic device into groups having priorities, based on a user's use history for each of the at least one function; and displaying the at least one object, based on the priorities of the groups, through the display so that the at least one object is seen to be disposed in the three-dimensional space around the electronic device.

16. The method of claim 9, wherein the controlling of the first external electronic device comprises:

based on the at least one function of the first external electronic device being mapped to the at least one key of the remote control device, displaying, through a display of the electronic device, an object to overlap the at least one key of the remote control device, the objecting indicating the at least one mapped function.

17. An electronic device comprising:

communication circuitry;

at least one processor including a processing circuitry; and memory storing instructions that, when executed by the at least one processor individually or collectively, cause the electronic device to:

detect a first external electronic device;

control the communication circuitry to establish a communication connection between the electronic device and the first external electronic device;

based on establishing the communication connection between the electronic device and the first external electronic device, detect a remote control device;

establish a communication connection with the detected remote control device through the communication circuitry;

based on establishing the communication connection between the electronic device and the first external electronic device, mapping at least one key of the remote control device and at least one function of the first external electronic device;

after mapping the at least one key of the remote control device and the at least one function of the first external electronic device, receiving, through the communication circuitry from the remote control device, information on a first key on which a user input is received among the at least one key of the remote control device; and transmit, through the communication circuitry to the first external electronic device, a signal causing control the first external electronic device to perform a function mapped to the first key among the at least one function.

18. The electronic device of claim 17, wherein the instructions, when executed by the at least one processor individually or collectively, further cause the electronic device to:

based on the first external electronic device and the electronic device being in communication connection, to display information about at least one remote control device capable of controlling the first external electronic device through a display of the electronic device.

* * * * *